(12) United States Patent
Hebrink et al.

(10) Patent No.: US 9,945,994 B2
(45) Date of Patent: Apr. 17, 2018

(54) UV STABLE ASSEMBLIES COMPRISING MULTI-LAYER OPTICAL FILM

(71) Applicant: 3M INNOVATIVE PROPERTIES COMPANY, St. Paul, MN (US)

(72) Inventors: Timothy J. Hebrink, Scandia, MN (US); Craig R. Schardt, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 191 days.

(21) Appl. No.: 14/415,967

(22) PCT Filed: Jul. 1, 2013

(86) PCT No.: PCT/US2013/048884
§ 371 (c)(1),
(2) Date: Jan. 20, 2015

(87) PCT Pub. No.: WO2014/022049
PCT Pub. Date: Feb. 6, 2014

(65) Prior Publication Data
US 2015/0177432 A1    Jun. 25, 2015

Related U.S. Application Data

(60) Provisional application No. 61/677,199, filed on Jul. 30, 2012.

(51) Int. Cl.
*G02B 5/22* (2006.01)
*G02B 19/00* (2006.01)
(Continued)

(52) U.S. Cl.
CPC ............ *G02B 5/223* (2013.01); *G02B 5/0841* (2013.01); *G02B 5/208* (2013.01); *G02B 5/22* (2013.01);
(Continued)

(58) Field of Classification Search
CPC . G02B 5/208; G02B 5/22–5/226; G02B 5/26; G02B 5/283; G02B 5/285–5/288; G02B 5/0284; G02B 5/0294
(Continued)

(56) References Cited

U.S. PATENT DOCUMENTS

| | | |
|---|---|---|
| 5,504,134 A | 4/1996 | Palmer |
| 5,540,978 A | 7/1996 | Schrenk |

(Continued)

FOREIGN PATENT DOCUMENTS

| | | |
|---|---|---|
| WO | 2010/078046 | 7/2010 |
| WO | 2011/062932 | 5/2011 |
| WO | 2013/142239 | 9/2013 |

OTHER PUBLICATIONS

International Search Report for PCT International Application No. PCT/US2013/048884, dated Jan. 15, 2014, 6 pages.

*Primary Examiner* — Bumsuk Won
*Assistant Examiner* — Jeffrey Madonna
(74) *Attorney, Agent, or Firm* — Gregory D. Allen

(57) ABSTRACT

Assemblies comprising multi-layer optical film comprising optical layers reflecting incident UV and blue light over specified wavelength ranges. Embodiments of the multi-layer optical films are useful, for example, as a UV protective covering. An exemplary UV stable assembly comprises a multi-layer optical film comprising at least a first plurality of first and second optical layers reflecting at least 50 percent of incident UV light over at least a 30 nanometer wavelength range in a wavelength range from at least 300 nanometers to 400 nanometers, and a second plurality of first and second optical layers reflecting at least 50 percent of incident light over at least 30 nanometer wavelength in a wavelength range from at least 430 nanometers to 500 nanometers.

9 Claims, 8 Drawing Sheets

(51) Int. Cl.
  *G02B 5/20* (2006.01)
  *G02B 5/26* (2006.01)
  *G02B 5/28* (2006.01)
  *G02C 7/10* (2006.01)
  *G02B 5/08* (2006.01)
  *F21V 8/00* (2006.01)

(52) U.S. Cl.
  CPC ............... *G02B 5/26* (2013.01); *G02B 5/283* (2013.01); *G02B 19/0042* (2013.01); *G02C 7/10* (2013.01); *G02B 6/005* (2013.01); *G02B 6/0065* (2013.01)

(58) Field of Classification Search
  USPC ......... 359/577–590, 350–361, 601–603, 885
  See application file for complete search history.

(56) References Cited

U.S. PATENT DOCUMENTS

| | | | |
|---|---|---|---|
| 5,699,188 A | 12/1997 | Gilbert | |
| 5,876,688 A | 3/1999 | Laundon | |
| 6,088,163 A | 7/2000 | Gilbert | |
| 6,157,486 A | 12/2000 | Benson, Jr. | |
| 6,391,400 B1 * | 5/2002 | Russell | B32B 17/10 |
| | | | 296/84.1 |
| 6,449,093 B2 | 9/2002 | Hebrink | |
| 6,498,683 B2 | 12/2002 | Condo | |
| 6,744,561 B2 | 6/2004 | Condo | |
| 6,783,349 B2 | 8/2004 | Neavin | |
| 7,153,588 B2 | 12/2006 | McMan | |
| 8,629,903 B2 | 1/2014 | Seder | |
| 8,830,141 B2 | 9/2014 | Seder | |
| 2001/0003363 A1 * | 6/2001 | Marien | C08J 5/18 |
| | | | 252/589 |
| 2002/0030882 A1 * | 3/2002 | Vitt | C03C 17/3417 |
| | | | 359/350 |
| 2004/0085642 A1 * | 5/2004 | Condo | B29C 55/023 |
| | | | 359/589 |
| 2004/0145288 A1 | 7/2004 | Ouderkirk | |
| 2005/0179995 A1 * | 8/2005 | Nikolov | G02B 5/285 |
| | | | 359/359 |
| 2005/0186408 A1 * | 8/2005 | Condo | B29C 55/023 |
| | | | 428/212 |
| 2006/0084780 A1 | 4/2006 | Hebrink | |
| 2009/0283133 A1 | 11/2009 | Hebrink | |
| 2009/0283144 A1 | 11/2009 | Hebrink | |
| 2010/0041787 A1 * | 2/2010 | Chen | C07D 251/24 |
| | | | 523/106 |
| 2011/0171440 A1 | 7/2011 | Cheng | |
| 2012/0011850 A1 | 1/2012 | Hebrink | |
| 2012/0229893 A1 | 9/2012 | Hebrink | |
| 2014/0083482 A1 | 3/2014 | Hebrink | |

* cited by examiner

UV STABLE ASSEMBLIES COMPRISING MULTI-LAYER OPTICAL FILM

CROSS REFERENCE TO RELATED APPLICATIONS

This application is a national stage filing under 35 U.S.C. 371 of PCT/US2013/048884, filed Jul. 1, 2013, which claims priority to U.S. Provisional Application No. 61/677,199, filed Jul. 30, 2012, the disclosures of which are incorporated by reference in their entireties herein.

BACKGROUND

Ultraviolet (UV) light degradation of materials is a significant problem for many materials. Although there are various UV protective materials known in the art, a need exists for more improvements in such materials, and preferably for more effective UV light blocking UV materials, especially those that provide long term protection (i.e., at least 10 years) protection for articles intended to have a long useful life outdoors. In particular, materials (e.g., films) made with polymers containing aromatic compounds (e.g., aromatic polyesters, aromatic polycarbonates, polystyrenes, polyethylene 2,6 naphthalate, and certain polyimides (e.g., those available under the trade designations "ULTEM" from Sabic Innovative Plastics, Pittsfield, Mass., and "KAPTON" from E.I. DuPont de Nemours, Wilmington, Del.) need substantial UV protection to last more than 10 years outdoors.

2,6 polyethylenenaphthalate (PEN) has been used to make a variety of articles, including films and multilayer optical films (e.g., mirror films and reflective polarizer films). Mirror films have been used in daylighting applications for guiding sun light deep into the interior of buildings and as solar concentrating mirrors. Mirror films have also been used as reflectors in light emitting diode (LED) lighted displays, for example, to increase their efficiency. Reflective polarizer films have been used, for example, for brightness enhancement in projectors and liquid crystal displays including outdoor displays.

SUMMARY

In one aspect, the present disclosure describes a UV stable assembly comprising a multi-layer optical film comprising at least a first plurality of first and second optical layers reflecting at least 50 (in some embodiments, at least 55, 60, 65, 70, 75, 80, 85, or even at least 90) percent of incident UV light over at least a 30 nanometer wavelength range in a wavelength range from at least 300 nanometers to 400 nanometers, and a second plurality of first and second optical layers reflecting at least 50 (in some embodiments, at least 60, 65, 70, 75, 80, 85, 90, 95, 96, 97, 98, or even at least 99) percent of incident light over at least 30 nanometer wavelength in a wavelength range from at least 430 nanometers to 600 nanometers (in some embodiments, from at least 430 nm to 500 nm, 440 nm to 500 nm, 450 nm to 500 nm, 430 nm to 470 nm, 440 nm to 470 nm, or even at least 450 nm to 480 nm). In some embodiments, at least one of the first or second optical layers of at least one of the first or second plurality of layers comprises a UV absorber.

In another aspect, the present disclosure describes a UV stable assembly comprising:
a first layer that absorbs at least 90 (in some embodiments, at least 91, 92, 93, 94, 95, 96, 97, 98, or even at least 99) percent of incident UV light over a wavelength range from at least 300 nanometers to 400 nanometers;
a multi-layer optical film comprising a plurality of first and second optical layers that reflects at least 50 (in some embodiments, at least 60, 65, 70, 75, 80, 85, 90, 95, 96, 97, 98, or even at least 99) percent of incident light over at least 30 nanometer wavelength in a wavelength range from at least 430 nanometers to 600 nanometers (in some embodiments, from at least 430 nm to 500 nm, 440 nm to 500 nm, 450 nm to 500 nm, 430 nm to 470 nm, 440 nm to 470 nm, or even at least 450 nm to 480 nm), wherein the multi-layer optical film is essentially free of PEN (i.e., less than 1 (in some embodiments, less than 0.75, 0.5, 0.25, or even less than 0.1) percent by weight PEN, based on the total weight of the multi-layer optical film); and
a material that absorbs at least some (in some embodiments, at least 0.0001, 0.001, 0.01, 0.1, 1, 5, 10, 25, 50, 75, 90, 95, 96, 97, 98, or even at least 99) percent of incident light over a wavelength range from at least 430 nanometers to 600 nanometers (in some embodiments, from at least 430 nm to 500 nm, 440 nm to 500 nm, 450 nm to 500 nm, 430 nm to 470 nm, 440 nm to 470 nm, or even at least 450 nm to 480 nm),
wherein the assembly has, in order, the first layer that absorbs at least 90 percent of incident UV light, the multi-layer optical film comprising a plurality of first and second optical layers that reflects at least 50 percent of incident light, and the material that absorbs at least some incident light over a wavelength range of 430 nm to 500 nm. In some embodiments, at least one of the first or second layers of the multi-layer optical film comprises a UV absorber.

In another aspect, the present disclosure describes an assembly comprising:
a multi-layer optical film comprising at least first and second optical layers reflecting at least 50 (in some embodiments, at least 60, 65, 70, 75, 80, 85, 90, 95, 96, 97, 98, or even at least 99) percent of incident light over at least 30 nanometer wavelength in a wavelength range from at least 430 nanometers to 500 nanometers (in some embodiments, from at least 430 nm to 600 nm, 440 nm to 500 nm, 450 nm to 500 nm, 430 nm to 470 nm, 440 nm to 470 nm, or even at least 450 nm to 480 nm), wherein the plurality of first and second optical layers is essentially free of PEN (i.e., less than 1 (in some embodiments, less than 0.75, 0.5, 0.25, or even less than 0.1) percent by weight PEN, based on the total weight of the multi-layer optical film); and
a multi-layer optical film comprising at least one layer comprising PEN (in some embodiments, reflective over a range from at least 400 nm to 700 nm 400 nm to 800 nm, 400 nm to 900 nm, 500 nm to 700 nm, 500 nm to 900 nm, 800 nm to 1200 nm, 800 nm to 1600 nm, or even at least 800 nm to 2500 nm). In some embodiments, at least one layer of the assembly comprises a UV absorber.

Assemblies and articles described herein are useful, for example, as a UV-protective covering. For example, the present disclosure provides an article comprising a substrate having a major surface, and an assembly described herein on at least a portion of the major surface; a light assembly comprising an assembly described herein; a sign comprising an assembly described herein; a liquid crystal display (LCD) comprising an assembly described herein; a light emitting diode (LED) comprising an assembly described herein; a building exterior comprising an assembly described herein; a light guide comprising an assembly described herein; a projector comprising an assembly described herein; sunglasses comprising an assembly described herein; and adjacent to a photovoltaic module (e.g., a flexible module) (e.g., for increasing solar flux onto the photovoltaic module) comprising an assembly described herein; a photovoltaic module backsheet comprising an assembly described herein; and a metal vapor coated broadband mirror comprising an assembly described herein.

DETAILED DESCRIPTION

Figure 1:
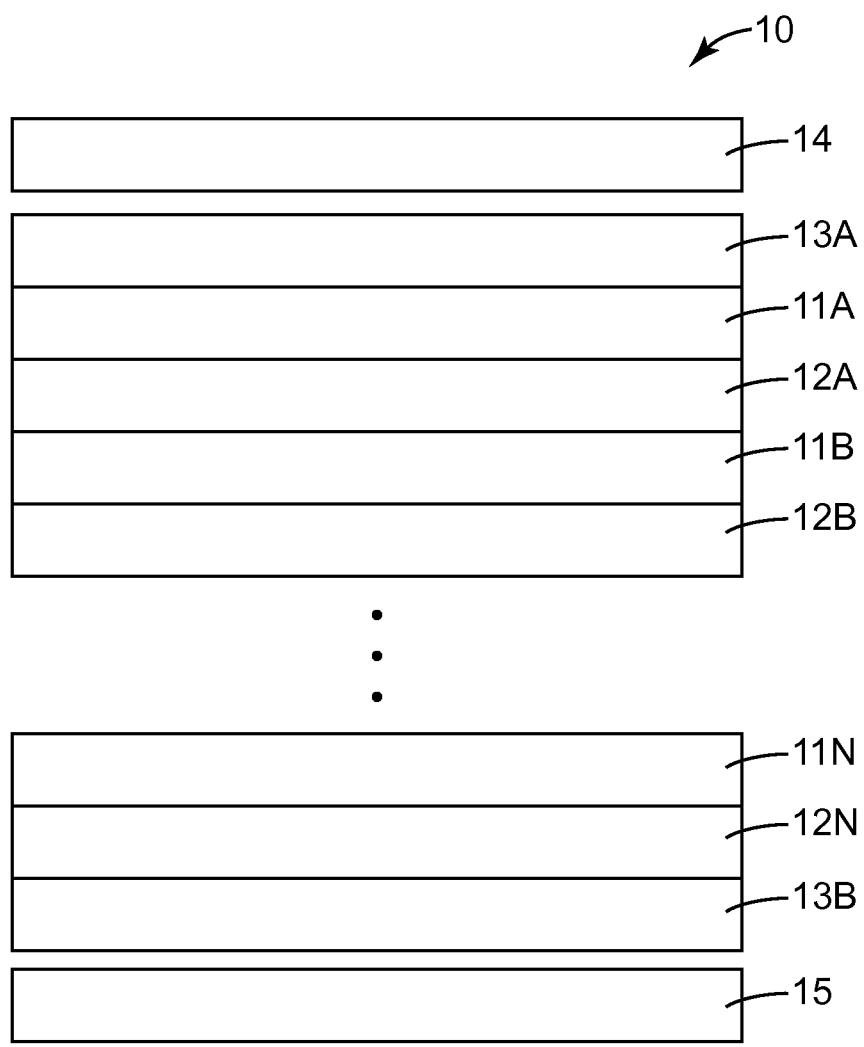
FIG. 1 is a schematic cross-sectional view of an exemplary assembly described herein.

Referring to FIG. 1, exemplary assembly 10 includes at least one hundred alternating first optical layers 11A, 11B, . . . 11N and second optical layers 12A, 12B, . . . 12N, third optical layers 13A, 13B, optional adhesive layer 15, and optional hardcoat layer 14, wherein at least some of the third optical layers includes a UV absorber. In some embodiments, at least some of first and/or second layers include a UV absorber.

Figure 2:
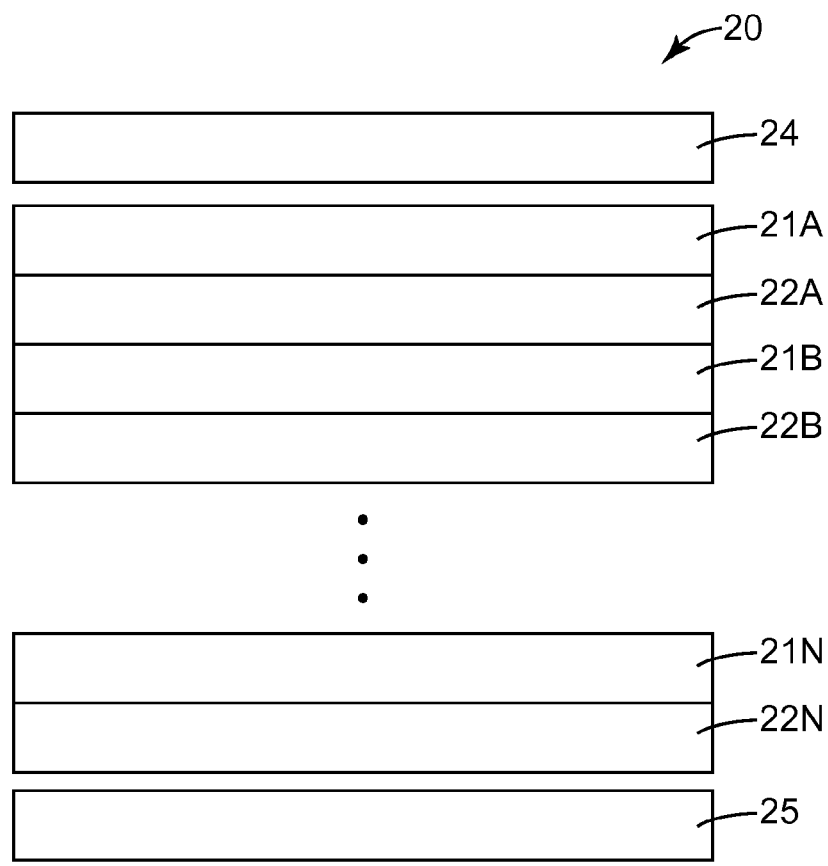
FIG. 2 is a schematic cross-sectional view of an exemplary multi-layer optical film used in exemplary assemblies described herein.

Referring to FIG. 2, exemplary multilayer optical film 20 includes at least one hundred alternating first optical layers 21A, 21B, . . . 21N and second optical layers 22A, 22B, . . . 22N, wherein at least some of at least one of the first or second optical layers includes a UV absorber for making an assembly described herein. Exemplary multilayer optical film 20 optionally includes adhesive layer 25, and hardcoat layer 24. In some embodiments, hardcoat layer 24 includes a UV absorber.

"Ultraviolet" (also "UV") as used herein refers to electromagnetic radiation having wavelengths up to 400 nm.

In general, multi-layer optical films described herein comprise at least 100 layers (typically in a range from 100 to 2000 total layers or more).

The alternating first and second layers of the multilayer optical films have a difference in refractive index of at least 0.04 for at least one wavelength and polarization of light (in some embodiments, at least 0.05, 0.06, 0.07, 0.08, 0.09, 0.1, 0.125, 0.15, 0.175, 0.2, 0.225, 0.25, 0.275, or even at least 0.3). In some embodiments, the first optical layer is birefringent and comprises a birefringent polymer. In some embodiments, at least one of the first, second, or third (if present) optical layers is at least one of fluoropolymer, silicone polymer, urethane polymer, or acrylate polymer (including blends thereof), and preferably is UV stable (i.e., after 3000 hours exposure to a Xenon arc lamp weatherometer according to ASTM G155-05a (October, 2005), the disclosure of which is incorporated herein by reference, has a change in b* of less than 5 units was measured with the spectrophotometer (available from Perkin-Elmer, Inc., Waltham, Mass., under the trade designation "Lambda 950").

Exemplary materials for making the optical layers that reflect (e.g., the first and second optical layers) include polymers (e.g., polyesters, copolyesters, and modified copolyesters). In this context, the term "polymer" will be understood to include homopolymers and copolymers, as well as polymers or copolymers that may be formed in a miscible blend, for example, by co-extrusion or by reaction, including transesterification. The terms "polymer" and "copolymer" include both random and block copolymers. Polyesters suitable for use in some exemplary multilayer optical films constructed according to the present disclosure generally include dicarboxylate ester and glycol subunits and can be generated by reactions of carboxylate monomer molecules with glycol monomer molecules. Each dicarboxylate ester monomer molecule has two or more carboxylic acid or ester functional groups and each glycol monomer molecule has at least two hydroxy functional groups. The dicarboxylate ester monomer molecules may all be the same or there may be two or more different types of molecules. The same applies to the glycol monomer molecules. Also included within the term "polyester" are polycarbonates derived from the reaction of glycol monomer molecules with esters of carbonic acid.

Examples of suitable dicarboxylic acid monomer molecules for use in forming the carboxylate subunits of the polyester layers include 2,6-naphthalene dicarboxylic acid and isomers thereof; terephthalic acid; isophthalic acid; phthalic acid; azelaic acid; adipic acid; sebacic acid; norbornenedicarboxylic acid; bi-cyclo-octane dicarboxylic acid; 1,4-cyclohexanedicarboxylic acid and isomers thereof; t-butylisophthalic acid, trimellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to C1-C10 straight-chain or branched alkyl groups.

Examples of suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol;

bicyclooctanediol; trimethylolpropane; pentaerythritol; 1,4-benzenedimethanol and isomers thereof; Bisphenol A; 1,8-dihydroxybiphenyl and isomers thereof; and 1,3-bis(2-hydroxyethoxy)benzene.

Another exemplary birefringement polymer useful for the reflective layer(s) is polyethylene terephthalate (PET), which can be made, for example, by reaction of terephthalic dicarboxylic acid with ethylene glycol. Its refractive index for polarized incident light of 550 nm wavelength increases when the plane of polarization is parallel to the stretch direction from about 1.57 to as high as about 1.69. Increasing molecular orientation increases the birefringence of PET. The molecular orientation may be increased by stretching the material to greater stretch ratios and holding other stretching conditions fixed. Copolymers of PET (CoPET), such as those described in U.S. Pat. No. 6,744,561 (Condo et al.) and U.S. Pat. No. 6,449,093 (Hebrink et al.), the disclosures of which are incorporated herein by reference, are particularly useful for their relatively low temperature (typically less than 250° C.) processing capability making them more coextrusion compatible with less thermally stable second polymers. Other semicrystalline polyesters suitable as birefringent polymers include polybutylene terephthalate (PBT), and copolymers thereof such as those described in U.S. Pat. No. 6,449,093 B2 (Hebrink et al.) and U.S. Pat. Pub. No. 20060084780 (Hebrink et al.), the disclosures of which are incorporated herein by reference. Another useful birefringent polymer is syndiotactic polystyrene (sPS).

First optical layers can also be isotropic high refractive index layers comprising materials selected from the group consisting of; poly(methyl methacrylate); copolymers of polypropylene; copolymers of polyethylene; cyclic olefin copolymers, thermoplastic polyurethanes, polystyrenes, isotactic polystyrene, atactic polystyrene, copolymers of polystyrene (e.g., copolymers of styrene and acrylate); polycarbonates, copolymers of polycarbonates, miscible blends of polycarbonates and copolyesters; and miscible blends of poly(methyl methacrylate) and poly(vinylidene fluoride).

Second optical layers can also comprise fluorinated copolymers materials selected from the group consisting of fluorinated ethylene propylene copolymer (FEP); copolymers of tetrafluorethylene, hexafluoropropylene, and vinylidene fluoride (THV); copolymers of tetrafluoroethylene, hexafluoropropylene, and ethylene. Particularly useful are melt processable copolymers of tetrafluoroethylene and at least two, or even at least three, additional different comonomers.

Exemplary melt processable copolymers of tetrafluoroethylene and other monomers discussed above include those available as copolymers of tetrafluoroethylene, hexafluoropropylene, and vinylidene fluoride under the trade designations "DYNEON THV220", "DYNEON THV230", "DYNEON THV2030", "DYNEON THV500", "DYNEON THV 610", and "DYNEON THV 815" from Dyneon LLC, Oakdale, Minn., those available under the trade designation "NEOFLON EFEP" from Daikin Industries, Ltd., Osaka, Japan; those available under the trade designation "AFLAS" from Asahi Glass Co. Ltd., Tokyo, Japan, and copolymers of ethylene and tetrafluoroethylene under the trade designations "DYNEON ET 6210A" and "DYNEON ET6235" from Dyneon LLC, and "TEFZEL ETFE" available from E.I. duPont de Nemours and Co., Wilmington, Del., and "FLUON ETFE" by Asahi Glass Co., Ltd.

In addition, the second polymer can be formed from homopolymers and copolymers of polyesters, polycarbonates, fluoropolymers, polyacrylates, and polydimethylsiloxanes, and blends thereof.

Optionally, assemblies comprising multi-layer optical films described herein further comprise at least one (in some embodiments at least two) (UV-absorbing) optical layer(s) comprising a polymer and a UV-absorber, and preferably serves as a UV protective layer. This optional UV absorbing optical layer can be, for example, a skin layer and/or hardcoat layer (i.e., both a skin layer and/or hardcoat) between the multi-layer optical film and the light source (in use). Typically, the polymer is a thermoplastic polymer. The third optical layer can comprise the same polymer as either the first optical layer, or the second optical layer. Examples of suitable polymers include polyesters (e.g., polyethylene terephthalate), fluoropolymers, acrylics (e.g., polymethyl methacrylate), silicone polymers (e.g., thermoplastic silicone polymers), styrenic polymers, polycarbonate copolymers (e.g. available, for example, under the trade designation "SLX2471T-NA9E166T" from SABIC, Exton, Pa.) polyolefins, olefinic copolymers (e.g., copolymers of ethylene and norbornene available as "TOPAS COC" from Topas Advanced Polymers, Florence, Ky.), silicone copolymers, fluoropolymers, and combinations thereof (e.g., a blend of polymethyl methacrylate and polyvinylidene fluoride).

Other exemplary polymers, for the optical layers, especially for use in the second layer, include homopolymers of polymethylmethacrylate (PMMA), such as those available from Ineos Acrylics, Inc., Wilmington, Del., under the trade designations "CP71" and "CP80;" and polyethyl methacrylate (PEMA), which has a lower glass transition temperature than PMMA. Additional useful polymers include copolymers of PMMA (CoPMMA), such as a CoPMMA made from 75 wt. % methylmethacrylate (MMA) monomers and 25 wt % ethyl acrylate (EA) monomers, (available from Ineos Acrylics, Inc., under the trade designation "PERSPEX CP63" or Arkema, Philadelphia, Pa., under the trade designation "ATOGLAS 510"), a CoPMMA formed with MMA comonomer units and n-butyl methacrylate (nBMA) comonomer units, or a blend of PMMA and poly(vinylidene fluoride) (PVDF).

Additional suitable polymers for the optical layers, especially for use in the second layer, include polyolefin copolymers such as poly (ethylene-co-octene) (PE-PO) available from Dow Elastomers, Midland, Mich., under the trade designation "ENGAGE 8200," poly (propylene-co-ethylene) (PPPE) available from Atofina Petrochemicals, Inc., Houston, Tex., under the trade designation "Z9470," and a copolymer of atactic polypropylene (aPP) and isotatctic polypropylene (iPP). The multilayer optical films can also include, for example, in the second layers, a functionalized polyolefin, such as linear low density polyethylene-graft-maleic anhydride (LLDPE-g-MA) such as that available from E.I. duPont de Nemours & Co., Inc., under the trade designation "BYNEL 4105."

Preferred polymer compositions for the third layer and/or second layers in alternating layers with the at least one birefringent polymer include PMMA, CoPMMA, poly(dimethylsiloxane oxamide) based segmented copolymer (SPDX), fluoropolymers including homopolymers such as PVDF and copolymers such as those derived from tetrafluoroethylene, hexafluoropropylene, and vinylidene fluoride (THV), blends of PVDF/PMMA, acrylate copolymers, styrene, styrene copolymers, silicone copolymers, polycarbonate, polycarbonate copolymers, polycarbonate blends, blends of polycarbonate and styrene maleic anhydride, and cyclic-olefin copolymers.

The selection of the polymer combinations used in creating the multilayer optical film depends, for example, upon the desired bandwidth that will be reflected. Higher refractive index differences between the first optical layer polymer and the second optical layer polymer create more optical power thus enabling more reflective bandwidth. Alternatively, additional layers may be employed to provide more optical power. Exemplary combinations of birefringent layers and second polymer layers may include, for example, the following: PET/THV, PET/SPDX, PET/CoPMMA, CoPEN/PMMA, CoPEN/SPDX, sPS/SPDX, sPS/THV, CoPEN/THV, PET/blend of PVDF/PMMA, PET/fluoroelastomers, sPS/fluoroelastomers and CoPEN/fluoroelastomers.

In one embodiment, at least two multilayer optical mirrors with different reflection bands are laminated together to broaden the reflection band. For example, a PET/CoPMMA multilayer reflective mirror which reflects 98% of the light from 350 nm to 470 nm would be laminated to a PEN/PMMA multilayer reflective mirror which reflects 98% of the light from 900 nm to 1200 nm to create a UV stabilized IR mirror reflecting light from 900 nm to 1200 nm. In another example, a PET/CoPMMA multilayer reflective mirror that reflects 96.8% of the light from 370 nm to 500 nm could be laminated to a PEN/PMMA multilayer reflective mirror which reflects 98% of the light from 500 nm to 1300 nm to create a broader band mirror reflecting light from 370 nm to 1300 nm. In some embodiments, the reflection bands of two multilayer mirrors overlap, for example, to avoid a leak of some wavelengths of light. In some embodiments, the reflection bands of two multilayer mirrors may have a slight separation, for example, to avoid undesirable cavity effects between the two layers.

Exemplary material combinations for making the optical layers that reflect UV light (e.g., the first and second optical layers) include PMMA (e.g., first optical layers)/THV (e.g., second optical layers), PMMA (e.g. first optical layers)/blend of PVDF/PMMA (e.g. second optical layers), PC (polycarbonate) (e.g., first optical layers)/PMMA (e.g., second optical layers), PC (polycarbonate) (e.g. first optical layers)/blend of PMMA/PVDF (e.g., second optical layers), blend of PMMA/PVDF (e.g. first optical layers)/blend of PVDF/PMMA (e.g. second optical layers) and PET (e.g., first optical layers)/CoPMMA (e.g., second optical layers).

Exemplary material for making the optical layers that absorb UV light include COC, EVA, TPU, PC, PMMA, CoPMMA, siloxane polymers, fluoropolymers, THV, PVDF or blends of PMMA and PVDF.

A UV absorbing layer (e.g., a UV protective layer) aids in protecting the visible/IR-reflective optical layer stack from UV-light caused damage/degradation over time by absorbing UV-light (e.g., any UV-light) that may pass through the UV-reflective optical layer stack. In general, the UV-absorbing layer(s) may include any polymeric composition (i.e., polymer plus additives), including pressure-sensitive adhesive compositions, that is capable of withstanding UV-light for an extended period of time.

Solar light, in particular the ultraviolet radiation from 280 to 400 nm, can induce degradation of plastics, which in turn results in color change and deterioration of optical and mechanical properties. Inhibition of photo-oxidative degradation is important for outdoor applications wherein long term durability is mandatory. The absorption of UV-light by polyethylene terephthalates, for example, starts at around 360 nm, increases markedly below 320 nm, and is very pronounced at below 300 nm. Polyethylene naphthalates strongly absorb UV-light in the 310-370 nm range, with an absorption tail extending to about 410 nm, and with absorption maxima occurring at 352 nm and 337 nm. Chain cleavage occurs in the presence of oxygen, and the predominant photooxidation products are carbon monoxide, carbon dioxide, and carboxylic acids. Besides the direct photolysis of the ester groups, consideration has to be given to oxidation reactions, which likewise form carbon dioxide via peroxide radicals.

A UV absorbing layer may protect the multilayer optical film by reflecting UV light, absorbing UV light, scattering UV light, or a combination thereof. In general, a UV absorbing layer may include any polymer composition that is capable of withstanding UV radiation for an extended period of time while either reflecting, scattering, or absorbing UV radiation. Examples of such polymers include PMMA, CoPMMA, silicone thermoplastics, fluoropolymers, and their copolymers, and blends thereof. An exemplary UV absorbing layer comprises PMMA/PVDF blends.

A variety of optional additives may be incorporated into an optical layer to make it UV absorbing. Examples of such additives include at least one of an ultra violet absorber(s), a hindered amine light stabilizer(s), or an anti-oxidant(s) thereof.

Particularly desirable UV absorbers are red shifted UV absorbers (RUVA) which absorb at least 70% (in some embodiments, at least 80%, particularly preferably greater than 90% of the UV light in the wavelength region from 180 nm to 400 nm. Typically, it is desirable if the RUVA is highly soluble in polymers, highly absorptive, photo-permanent and thermally stable in the temperature range from 200° C. to 300° C. for extrusion process to form the protective layer. The RUVA can also be highly suitable if they can be copolymerizable with monomers to form protective coating layer by UV curing, gamma ray curing, e-beam curing, or thermal curing processes.

RUVAs typically have enhanced spectral coverage in the long-wave UV region, enabling it to block the high wavelength UV light that can cause yellowing in polyesters. Typical UV protective layers have thicknesses in a range from 13 micrometers to 380 micrometers (0.5 mil to 15 mils) with a RUVA loading level of 2-10% by weight. One of the most effective RUVA is a benzotriazole compound, 5-trifluoromethyl-2-(2-hydroxy-3-alpha-cumyl-5-tert-octylphenyl)-2H-benzotriazole (sold under the trade designation "CGL-0139" from BASF, Florham Park, N.J.). Other preferred benzotriazoles include 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole. Further preferred RUVA includes 2(-4,6-diphenyl-1-3,5-triazin-2-yl)-5-hexyloxyphenol. Other exemplary UV absorbers include those available from BASF under the trade designation "TINUVIN 1577," "TINUVIN 900," "TINUVIN 1600." and "TINUVIN 777." Other exemplary UV absorbers are available, for example, in a polyester master batch under the trade designation "TA07-07 MB" from Sukano Polymers Corporation, Dunkin, S.C. An exemplary UV absorber for polymethylmethacrylate is a masterbatch available, for example, under the trade designation "TA11-10 MBO1" from Sukano Polymers Corporation. An exemplary UV absorber for polycarbonate is a masterbatch from Sukano Polymers Corporation, Dunkin S.C., under the trade designations "TA28-09 MB01." In addition, the UV absorbers can be used in combination with hindered amine light stabilizers (HALS) and anti-oxidants. Exemplary HALS include those available from BASF, under the trade designation "CHIMASSORB 944" and "TINUVIN 123." Exemplary anti-oxidants include those obtained under the trade designations "IRGANOX 1010" and "ULTRANOX 626", also available from BASF.

In some embodiments, the third UV absorbing (protective) layer is a multilayer optical film that reflects wavelengths of light from about 350 nm to about 400 nm, (in some embodiments from 300 nm to 400 nm). In these embodiments, the polymers for the UV absorbing layer preferably do not absorb UV light in the 350 nm to 400 nm range. Examples of the materials that are desirable for such embodiments include PMMA/PVDF, PMMA/THV, PC/SPDX, PMMA/SPDX, sPS/THV, sPS/SPDX, modified polyolefin copolymers (EVA) with THV, TPU/THV, and TPU/SPDX. In one exemplary embodiment, THV available under the trade designation "DYNEON THV 220 GRADE" and "DYNEON THV 2030 GRADE" from Dyneon LLC, Oakdale, Minn., are employed with PMMA for multilayer UV mirrors reflecting 300-400 nm or with Polycarbonate for multilayer mirrors reflecting 350 nm-400 nm.

Other additives may be included in a UV absorbing layer (e.g., a UV protective layer). Small particle non-pigmentary zinc oxide and titanium oxide can also be used as blocking or scattering additives in a UV absorbing layer. For example, nano-scale particles can be dispersed in polymer or coating substrates to minimize UV radiation degradation. The nano-scale particles are transparent to visible light while either scattering or absorbing harmful UV radiation thereby reducing damage to thermoplastics. U.S. Pat. No. 5,504,134 (Palmer et al.) describes attenuation of polymer substrate degradation due to ultraviolet radiation through the use of metal oxide particles in a size range of about 0.001 micrometer to about 0.2 micrometer in diameter, and more preferably from about 0.01 micrometer to about 0.15 micrometer in diameter. U.S. Pat. No. 5,876,688 (Laundon) describes a method for producing micronized zinc oxide that are small enough to be transparent when incorporated as UV blocking and/or scattering agents in paints, coatings, finishes, plastic articles, cosmetics and the like which are well suited for use in the present invention. These fine particles such as zinc oxide and titanium oxide with particle size ranged from 10 nm-100 nm that can attenuate UV radiation are available, for example, from Kobo Products, Inc. South Plainfield, N.J. Flame retardants may also be incorporated as an additive in a UV protective layer.

In addition to adding UV absorbers, HALS, nano-scale particles, flame retardants, and anti-oxidants to a UV absorbing layer, the UV absorbers, HALS, nano-scale particles, flame retardants, and anti-oxidants can be added to the multilayer optical films, and any optional durable top coat layers. Fluorescing molecules and optical brighteners can also be added to a UV absorbing layer, the multilayer optical layers, an optional hardcoat layer, or a combination thereof.

The desired thickness of a UV protective layer is typically dependent upon an optical density target at specific wavelengths as calculated by Beers Law. In some embodiments, the UV protective layer has an optical density greater than 3.5, 3.8, or 4 at 380 nm; greater than 1.7 at 390 nm; and greater than 0.5 nm at 400 nm. Those of ordinary skill in the art recognize that the optical densities typically should remain fairly constant over the extended life of the article in order to provide the intended protective function.

The UV protective layer, and any optional additives, may be selected to achieve the desired protective functions such as UV protection. Those of ordinary skill in the art recognize that there are multiple means for achieving the noted objectives of the UV protective layer. For example, additives that are very soluble in certain polymers may be added to the composition. Of particular importance, is the permanence of the additives in the polymer. The additives should not degrade or migrate out of the polymer. Additionally, the thickness of the layer may be varied to achieve desired protective results. For example, thicker UV protective layers would enable the same UV absorbance level with lower concentrations of UV absorbers, and would provide more UV absorber permanence attributed to less driving force for UV absorber migration. One mechanism for detecting the change in physical characteristics is the use of the weathering cycle described in ASTM G155-05a (October, 2005) and a D65 light source operated in the reflected mode. Under the noted test, and when the UV protective layer is applied to the article, the article should withstand an exposure of at least 18,700 kJ/m2 at 340 nm before the b* value obtained using the CIE L*a*b* space increases by 5 or less, 4 or less, 3 or less, or 2 or less before the onset of significant cracking, peeling, delamination, or haze.

Optionally, assemblies described herein can further comprise at least one layer comprising polyethylenenapththalate.

Figure 14:
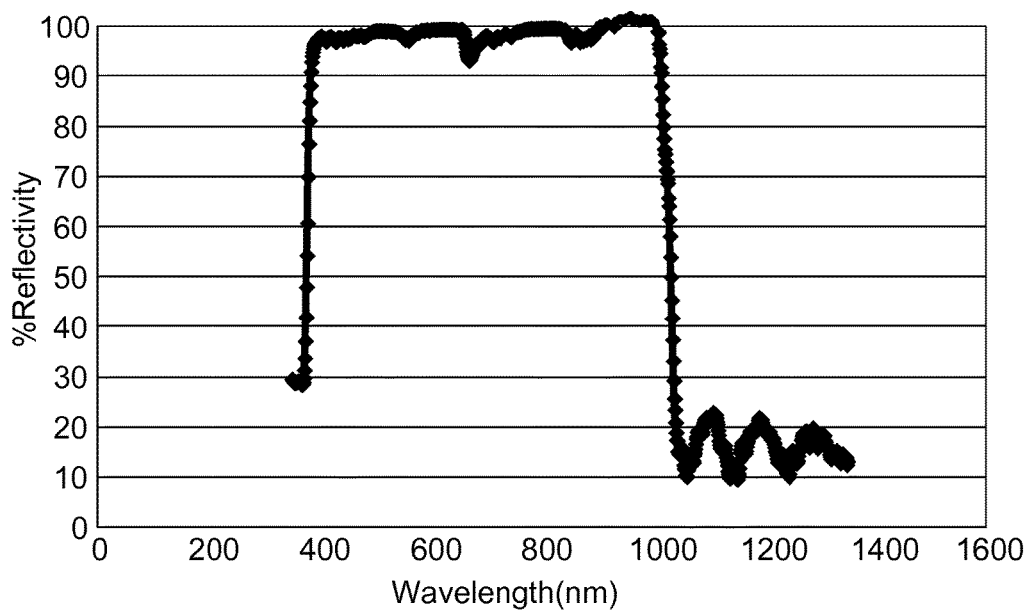
FIG. 14 is the reflection spectra of an exemplary assembly described herein.

In addition to degradation caused by ultra-violet light, polymers (e.g., PEN (polyethylenenaphthalate)) can degrade from exposure to blue light in the wavelength range of 400 nm to 490 nm. Furthermore, exposing PEN-based films protected by using UV filters blocking 99.99% of the light below 400 nm degrade when exposed to blue light. An exemplary film made with PEN is a highly reflective multilayer optical mirror film available under the trade designation "VIKUITI ENHANCED SPECULAR REFLECTOR (ESR)" from 3M Company, St. Paul, Minn. Use of UV stable multi-layer optical films described herein with highly reflective multilayer PEN-based optical mirror films in applications where there is exposure to blue light (e.g., brightness enhancement of LED lighted displays and daylighting light guides) can improve protection against degradation (see, e.g., FIG. 14).

Multilayer optical films described herein can be made using general processing techniques, such as those described in U.S. Pat. No. 6,783,349 (Neavin et al.), the disclosure of which is incorporated herein by reference.

Desirable techniques for providing a multilayer optical film with a controlled spectrum include the use of an axial rod heater control of the layer thickness values of coextruded polymer layers as described, for example, in U.S. Pat. No. 6,783,349 (Neavin et al.); timely layer thickness profile feedback during production from a layer thickness measurement tool such as e.g. an atomic force microscope (AFM), a transmission electron microscope, or a scanning electron microscope; optical modeling to generate the desired layer thickness profile; and repeating axial rod adjustments based on the difference between the measured layer profile and the desired layer profile.

The basic process for layer thickness profile control involves adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers. Once calibrated, the necessary power adjustments can be calculated once given a target profile and a measured profile. The procedure is repeated until the two profiles converge.

The layer thickness profile (layer thickness values) of multi-layer optical film described herein reflecting at least 50 percent of incident UV light over a specified wavelength range can be adjusted to be approximately a linear profile with the first (thinnest) optical layers adjusted to have about a ¼ wave optical thickness (index times physical thickness) for 300 nm light and progressing to the thickest layers which would be adjusted to be about ¼ wave thick optical thickness for 400 nm light.

Optional hardcoat can be provided by techniques known in the art, including those described in U.S. Pat. No. 7,153,588 (McMan) and application having U.S. Ser. No. 61/614,297 (Clear et al.), the disclosures of which are incorporated herein by reference. Additional hard coats include silica filled siloxanes available, for example, from California Hard Coat, San Diego, Calif., under the trade designation "PERMANEW", and from Momentive, Columbus, Ohio, under the trade designations "AS4000" and "AS4700". Exemplary acrylic UV protective hardcoats are available, for example, under the trade designations "UVT610(GEN IV)" and "UVT200" from Red Spot Paint & Varnish Company, Evansville, Ind. Exemplary UV protective acrylic hard coats are disclosed, for example, in application having U.S. Ser. No. 61/614,297, filed Mar. 22, 2012. Use of hardcoats can, for example, reduce or prevent premature degradation of the article due to exposure to outdoor elements. The hardcoat is generally abrasion and impact resistant and does not interfere with the primary function of reflecting a selected bandwidth of electromagnetic radiation.

A hardcoat can also provide mechanical durability to the article. Some mechanisms for measuring mechanical durability may be either impact or abrasion resistance. Taber abrasion is one test to determine a film's resistance to abrasion, and resistance to abrasion is defined as the ability of a material to withstand mechanical action such as rubbing scrapping, or erosion. According to the ASTM D1044-08 (2008) test method, a 500-gram load is placed on top of CS-10 abrader wheel and allowed to spin for 50 revolutions on a 25.8 cm$^2$ (4 in.$^2$) test specimen. The reflectivity of the sample before and after the Taber abrasion test is measured, and results are expressed by changes in % reflectivity. For the purpose of this invention, change in % reflectivity is expected to be less than 20% (in some embodiments, less than 10%, or even less than 5%).

Other suitable tests for mechanical durability include break elongation, pencil hardness, sand blast test, and sand shaking abrasion. UV absorbers and appropriate UV stabilizers described above can be added into the top coat for stabilizing the coating as well as for protection of the substrates. The substrates coated with such a durable hard coat are thermoformable before being fully cured at an elevated temperature, and a durable hard coat can then be formed by a post curing at 80° C. for 15-30 minutes. In addition, siloxane components used as a durable top coat are hydrophobic in nature and can provide an easy clean surface function to the articles disclosed herein.

Due to the outdoor application, weathering resistance is a desirable characteristic of the article. Accelerated weathering studies are one option for qualifying the performance of the article. Accelerated weathering studies are generally performed on films using techniques similar to those described in ASTM G-155-05a (October, 2005), "Standard practice for exposing non-metallic materials in accelerated test devices that use laboratory light sources". The noted ASTM technique is considered as a sound predictor of outdoor durability, that is, ranking materials performance correctly.

Hardcoat layers may include at least one of PMMA/PVDF blends, thermoplastic polyurethanes, curable or cross-linked polyurethanes, CoPET, cyclic olefin copolymers (COC's), fluoropolymers and their copolymers such as PVDF, ETFE, FEP, and THV, thermoplastic and curable acrylates, cross-linked acrylates, cross-linked urethane acrylates, cross-linked urethanes, curable or cross-linked polyepoxides, cross-linked fluoropolymers (e.g., available, for example, under the trade designation "LUMIFLON" from AGC Chemicals, Exton, Pa.), or cross-linked silicones. Strippable polypropylene copolymer skins may also be employed. Alternatively, for example, silane silica sol copolymer hardcoating can be applied to improve scratch resistance. The hardcoat may contain UV absorbers, HALS, and anti-oxidants as described above.

Optionally a tie layer may be interposed between the outer surface of the stack of first and second layers and UV protective layer, a hardcoat layer, etc. to assist in adherence and provide long term stability in use. Examples of tie layers include: hot-melt adhesives, acrylates, acrylate copolymers, and CoPETs including modifications such as with functional groups sulfonic acids, PMMA/PVDF blends, and modified olefins with functional comonomers such as maleic anhydride, acrylic acid, methacrylic acid or vinyl acetate. Additionally, UV or thermally curable acrylates, silicones, epoxies, siloxanes, urethanes, urethane acrylates may be suitable as tie layers. The tie-layers may optionally contain UV absorbers as described above. The tie layers may optionally contain conventional plasticizers, tackifiers, or combinations thereof. The tie layer may be applied utilizing conventional film forming techniques.

It is within the scope of the present disclosure to include UV absorbing layers (e.g. UV protective layers) on both major surfaces of the stack of first and second optical layers. Also, in some embodiments, it may be desirable to have a UV absorbing layer (e.g., UV protective layer) on the opposite of the stack of first and second optical layers for a specific application requirement. In some embodiments, it may be desirable to provide a UV absorbing layer (e.g., UV protective layer) only on the multilayer optical film in order to provide backside protection from UV radiation. Other potential embodiments can include carbon black or an IR absorbing layer on one or more of the major surfaces of the stack of first and second optical layers. In another embodiment an antireflective coating can be on the backside of the stack of first and second optical layers to reduce or prevent backside IR reflection. Tie layers, such as those discussed above can be used in providing these additional exemplary embodiments.

Some embodiments of assemblies described herein have a UV transmission band edge in a range from 10 to 90 percent transmission spanning less than 20 (in some embodiments, less than 15 or 10) nanometers, where the UV transmission band edge is defined as 50 percent transmission along the slope from 10 percent transmission to 90 percent transmission.

The collective thickness of the layers of exemplary assemblies described herein may preferably be in a range from 25 micrometers to 250 micrometers. The optical layers that absorb (e.g., the third optical layer) of exemplary assemblies described herein may have a collective thickness in a range from 10 micrometers to 200 micrometers.

Assemblies described herein are useful, for example, as a UV protective covering. For example, the present disclosure provides an article comprising a substrate having a major surface, and an assembly described herein on at least a portion of the major surface; a light assembly comprising an assembly described herein; a shaped reflector comprising an assembly described herein; a sign comprising an assembly described herein; an LCD comprising an assembly described herein; a light emitting diode (LED) comprising an assembly described herein; a building exterior comprising an assembly described herein; a light guide comprising an assembly described herein; a projector comprising an assembly described herein; sunglasses comprising an assembly described herein; a reflector adjacent to a photovoltaic module (e.g., a flexible module) for the purpose of increasing solar flux onto the photovoltaic module comprising an assembly described herein, a photovoltaic module backsheet comprising an assembly described herein; and a metal vapor coated broadband mirror comprising an assembly described herein.

Figure 3:
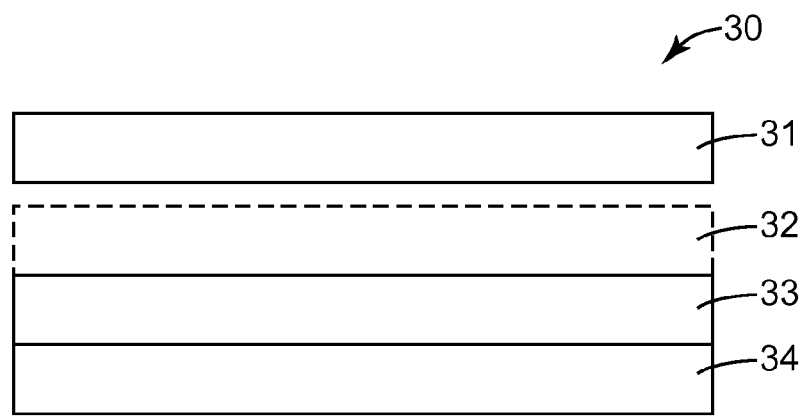
FIG. 3 is a schematic cross-sectional view of an exemplary liquid crystal display cell comprising an exemplary assembly described herein.

Referring to FIG. 3, exemplary liquid crystal display device 30 includes liquid crystal display 31, exemplary assembly described herein 33 that includes visible mirror film comprising PEN multi-layer optical film 34 and optional hardcoat layer 32. The assembly can be incorporated into liquid crystal display devices using techniques generally known in the art.

Figure 4:
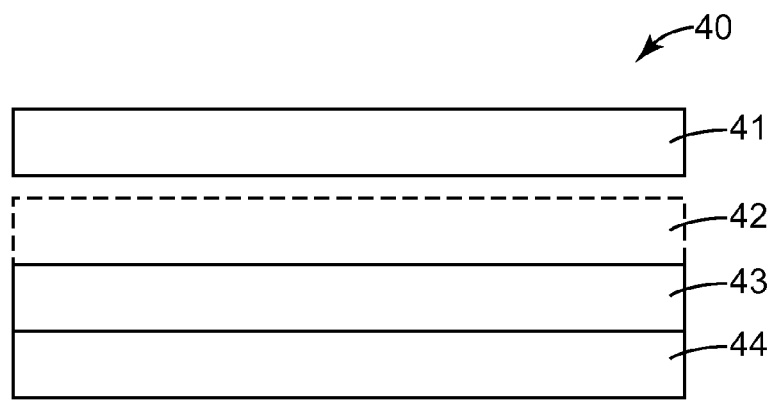
FIG. 4 is a schematic cross-sectional view of an exemplary light emitting diode (LED) comprising an exemplary assembly described herein.

Referring to FIG. 4, exemplary light emitting diode (LED) 40 includes light emitting diode 41, exemplary assembly described herein 43 that includes visible mirror film comprising PEN multi-layer optical film 44 and optional hardcoat layer 42. The assembly can be incorporated into light emitting diodes using techniques generally known in the art.

Figure 5:
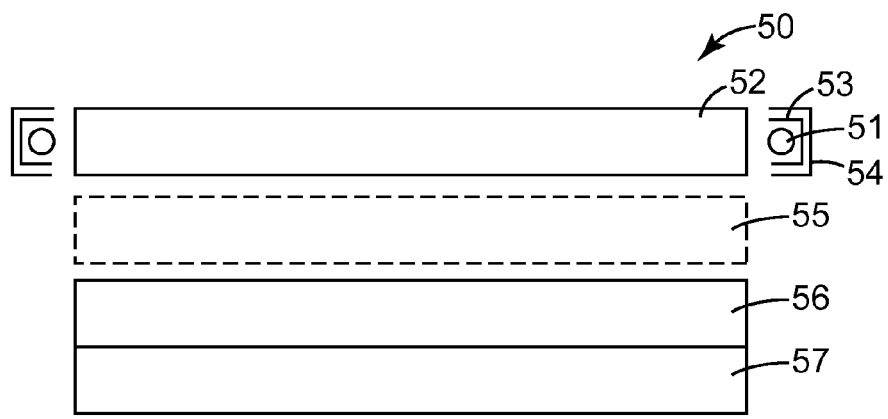
FIG. 5 is a schematic cross-sectional view of an exemplary LED light guide comprising an exemplary assembly described herein.

Referring to FIG. 5, exemplary light emitting diode (LED) light guide 50 includes light emitting diode 51, light guide 52, exemplary assembly described herein 53 and 56, includes visible mirror layer comprising PEN multi-layer optical film 54 and 57, and optional adhesive layer 55. The assembly can be incorporated, for example, into a light emitting diode using techniques generally known in the art.

Figure 6:
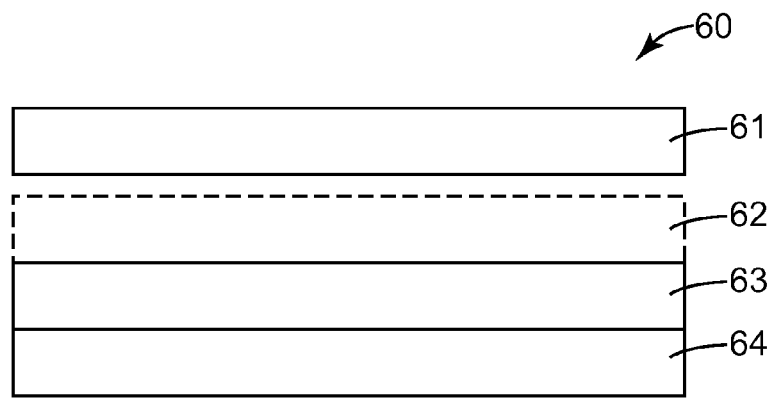
FIG. 6 is a schematic cross-sectional view of an exemplary lighted sign comprising an exemplary assembly described herein.

Referring to FIG. 6, commercial sign 60 includes lighted sign 61, exemplary assembly described herein 63 that includes visible mirror comprising PEN multi-layer optical film 64, and optional hardcoat layer 62. The assembly can be incorporated into commercial graphic signage constructions using techniques generally known in the art.

Figure 7:
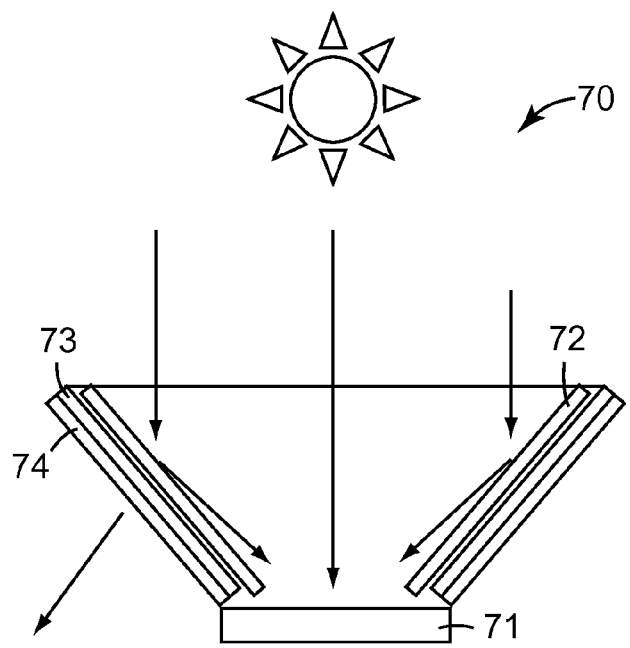
FIG. 7 is a schematic cross-sectional view of an exemplary wavelength selective solar concentrating mirror comprising an exemplary assembly described herein.

Referring to FIG. 7, wavelength selective solar concentrating mirror 70 includes photovoltaic cell 71, exemplary assembly described herein 73 that includes visible and/or infrared mirror comprising PEN 74, and optional hard coat 72. The assembly can be incorporated, for example, into solar concentrating mirror designs using techniques generally known in the art such reported, for example, in PCT Pat. Pub. No. WO/2009/140493A1, published Nov. 19, 2009, and application having U.S. Ser. No. 61/484,068 (Hebrink), filed May 9, 2011, the disclosures of which are incorporated herein by reference.

Another use of exemplary assemblies described herein is, for example with a solar concentrating mirror adjacent to a photovoltaic cell, or plurality of photovoltaic cells, for increasing solar flux having a bandwidth of light that corresponds to the absorption bandwidth of the photovoltaic cell onto the photovoltaic cell. In some embodiments, the resulting article reflects at least a portion of the light across the range of wavelengths that corresponds with the absorption bandwidth of the solar cell and either transmits or absorb a major portion of the light outside the absorption bandwidth of the solar cell to minimize overheating of the solar cell and solar cell encapsulating materials. In some embodiments, the article is a compliant sheet that may readily formed into useful shapes or construction for concentrating solar light. The article may be thermoformed into troughs, ridges, parabolic shapes, and non-imaging concentrating geometries for reflecting only electromagnetic energy onto a solar cell that is useful for generating electricity. In some embodiments, the reflective concentrating mirror includes a multilayer optical stack comprising a plurality of alternating first optical layers not including PEN (polyethylenenaphthalate) and second optical layers with different refractive indices that reflect at least 90% of the light having a bandwidth of at least 30 nm over a wavelength range of 400 nm-500 nm. In some embodiments, the reflective film also include a second multilayer optical stack comprising PEN first optical layers and second optical layers with different indices of refraction that reflects at least a portion of the light in the range of wavelengths that corresponds with the absorption bandwidth of the photovoltaic cell. In some embodiments, the second reflective multi-layer optical film has a left band edge in the range of 600 nm to 900 nm and transmits visible light. Visible light transmitting mirrors are useful, for example, in building-integrated photovoltaic (BIPV) applications for the purpose of daylighting the interior of a building or structure.

Figure 8:
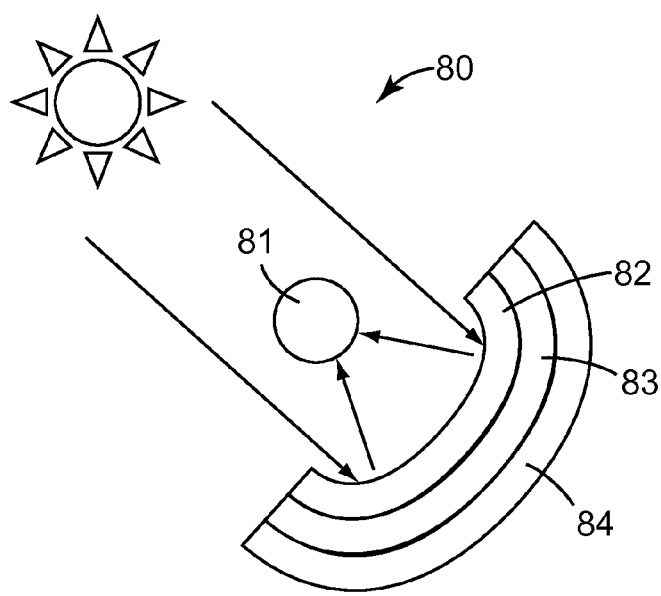
FIG. 8 is a schematic cross-sectional view of an exemplary broadband solar concentrating mirror comprising an exemplary assembly described herein.

Referring to FIG. 8, broadband solar concentrating mirror 80 includes solar energy absorbing device 81, exemplary assembly described herein 83 that includes broadband reflective mirror 84, and optional hard coat 82. The assembly can be incorporated into broadband solar concentrating mirror designs using techniques generally known in the art such as is reported in, for example, in PCT Pat. Pub. No. WO/2010/078105A1, published Jul. 8, 2010, and U.S. Pat. Pub. No. 2012/0011850, published Jan. 19, 2012, the disclosures of which are incorporated herein by reference.

Another use of exemplary assembly described herein includes use with broad band mirrors for concentrating solar energy onto a solar energy absorbing device that contains heat transfer fluids that heat up and whose thermal energy is then transferred (e.g., for heating) or turned into electrical power (e.g., by use of a steam turbine generator). In some embodiments, the reflective concentrating mirror includes a multilayer optical stack comprising a plurality of alternating first optical layers not including PEN (polyethylenenaphthalate) and second optical layers with different refractive indices that reflect at least 90% of the light having a bandwidth of at least 30 nm over a wavelength range of 400 nm-500 nm (e.g., blue reflector). In some embodiments, the first non-PEN based multilayer optical stack can also reflect 300 nm-400 nm (UV reflector) and reflect 300 nm-500 nm (UV-blue reflector). In some embodiments, the reflective film also includes a second multilayer optical stack comprising PEN first optical layers and second optical layers with different indices of refraction that reflects at least a portion of the light beyond 500 nm. In some embodiments, the second multilayer optical stack also includes reflective metal layers on the side opposite the blue (400 nm-500 nm) reflecting multilayer optical stack. Metals useful for reflecting light include at least one of silver, copper, nickel, aluminum, or combinations thereof. In some embodiments, the multi-layer optical film includes a tie-layer that improves adhesion of the metal reflective layer to the multilayer optical film. In some embodiments, the tie-layer comprises a thin (10 nm-30 nm) inorganic oxide layer. Exemplary inorganic oxide tie-layers include titanium oxides, zirconium oxides, and aluminum oxides. In some embodiments, the broadband reflector has an average reflectivity of at least 95% over a wavelength range of 350 nm to 2500 nm.

Figure 9:
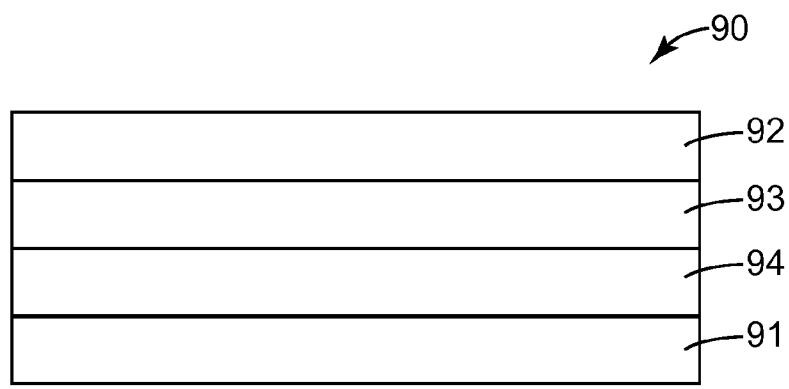
FIG. 9 is a schematic cross-sectional view of exemplary sunglasses comprising an exemplary assembly described herein.

Referring to FIG. 9, sunglasses 90 includes sun glass lens 91, exemplary assembly described herein 93 that includes optional adhesive layer 94 and optional hard coat layer 92. The assembly can be incorporated into sunglasses, for example, using techniques generally known in the art.

Another use of exemplary assemblies described herein is with an architectural component comprising a photovoltaic cell having an absorption bandwidth and a visible light-transmitting reflector positioned to reflect light onto the photovoltaic cell. In some embodiments, the visible light-transmitting reflector includes a multilayer optical film having an optical stack with a plurality of alternating first and second optical layers with different indices of refraction. In some embodiments, the multilayer optical film reflects at least a portion of light in a range of wavelengths that corresponds with the absorption bandwidth of the photovoltaic cell.

In some embodiments of photovoltaic module constructions (e.g., conventional roof-top modules) transmission to visible light is unnecessary. For example, solar backsheets or reflectors on roof tops are often formed on opaque substrates. In some embodiments, for example, concentrated photovoltaic applications, it may be considered desirable for a reflector (concentrating mirror) to reflect most of the light usable by photovoltaic cells, which tend to absorb light in the visible range. For example, PCT Pat. Pub. No. 2009/140493 (Hebrink et al.), published Nov. 19, 2009, the disclosure of which is incorporated herein by reference, discloses a multilayer film, useful as a solar concentrating mirror, that reflects at least a major portion of the average light across the range of wavelengths that corresponds with the absorption bandwidth of the solar cell onto the solar cell. In contrast, the reflectors can also reflect wavelengths in a range that are absorbed by a photovoltaic cell and also transmit visible light that is useful, for example, for daylighting inside a building or structure.

Another use of exemplary assemblies described herein is with a photovoltaic module including a reflective backsheet and a plurality of photovoltaic cells overlying the reflective backsheet. In some embodiments, the plurality of photovoltaic cells are spaced apart from each other such that open areas of the reflective backsheet are not covered by the plurality of photovoltaic cells. In some embodiments, the reflective multilayer optical film backsheet increases the power output of the photovoltaic cells through total internal reflection. In some embodiments, the reflective backsheet includes a multilayer optical stack comprising a plurality of alternating first optical layers not including PEN (polyethylenenaphthalate) and second optical layers with different refractive indices that reflect at least 90% of the light having a bandwidth of at least 30 nm over a wavelength range of 400 nm-500 nm. In some embodiments, the reflective backsheet also includes a multilayer optical stack comprising PEN first optical layers and second optical layers with different indices of refraction that reflects at least a portion of the light in the range of wavelengths that corresponds with the absorption bandwidth of the photovoltaic cell. In some embodiments, the reflective back sheet has a left band edge in the range of 600 nm to 900 nm and transmits visible light. In some embodiments, multilayer optical film backsheets are textured such that the optical layers reflect light at an angle which provides total internal reflection of light off the front air interface of the photovoltaic module back onto the photovoltaic cells.

Figure 10:
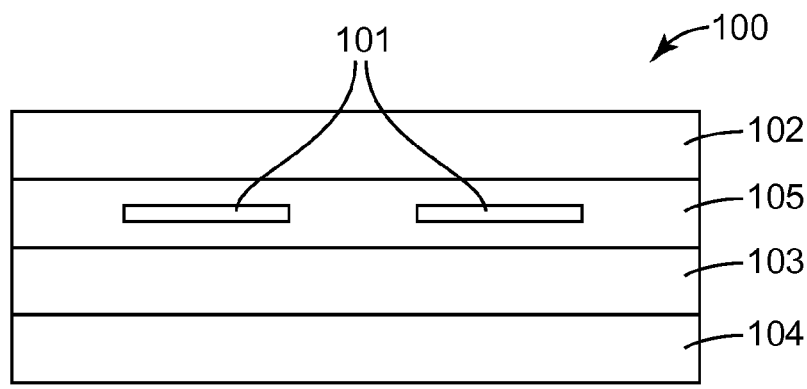
FIGS. 10 and 11 are schematic cross-sectional views of an exemplary photovoltaic module comprising an exemplary assembly described herein.

Referring to FIG. 10, photovoltaic module 100 includes photovoltaic module cell 101 exemplary assembly described herein 103 that includes visible and/or infrared mirror comprising PEN 104, encapsulant adhesive layer 105, and photovoltaic module top sheet layer 102.

Figure 11:
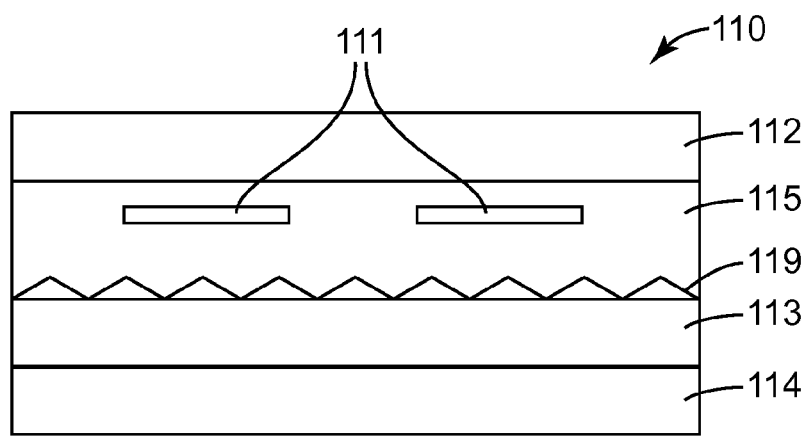

Referring to FIG. 11, photovoltaic module 110 includes photovoltaic module cell 111, exemplary assembly described herein 113 that includes visible and/or infrared multi-layer optical mirror film comprising PEN 114, adhesive encapsulant layer 115, and light scattering surface structure 119 for providing total internal reflection, and photovoltaic module top sheet 112.

Another use of exemplary assemblies described herein is with an architectural component comprising a photovoltaic cell having an absorption bandwidth and a visible light-transmitting reflector positioned to reflect light onto the photovoltaic cell. In some embodiments, the visible light-transmitting reflector includes a multilayer optical film having an optical stack with a plurality of alternating first and second optical layers with different indices of refraction. In some embodiments, the multilayer optical film reflects at least a portion of light in a range of wavelengths that corresponds with the absorption bandwidth of the photovoltaic cell.

In some embodiments of photovoltaic module constructions (e.g., conventional roof-top modules) transmission of visible light is unnecessary. For example, solar backsheets or reflectors on roof tops are often formed on opaque substrates. In some embodiments, for example, concentrated photovoltaic applications, it may be considered desirable for a reflector (concentrating mirror) to reflect most of the light usable by photovoltaic cells, which tend to absorb light in the visible range. For example, PCT Pat. App. Pub. No. 2009/140493 (Hebrink et al.), published Nov. 19, 2009, the disclosure of which is incorporated herein by reference, discloses a multilayer film, useful as a solar concentrating mirror, that reflects at least a major portion of the average light across the range of wavelengths that corresponds with the absorption bandwidth of the solar cell onto the solar cell. In contrast, the reflectors can also reflect wavelengths in a range that are absorbed by a photovoltaic cell and also transmit visible light that is useful, for example, for daylighting inside a building or structure.

Another use of exemplary assemblies described herein is with a photovoltaic module including a reflective backsheet and a plurality of photovoltaic cells overlying the reflective backsheet. In some embodiments, the plurality of photovoltaic cells are spaced apart from each other such that open areas of the reflective backsheet are not covered by the plurality of photovoltaic cells. In some embodiments, the reflective multilayer optical film backsheet increase the power output of the photovoltaic cells through total internal reflection. In some embodiments, the reflective backsheet includes a multilayer optical stack comprising a plurality of alternating first optical layers not including PEN (polyethylenenaphthalate) and second optical layers with different refractive indices that reflect at least 90% of the light having a bandwidth of at least 30 nm over a wavelength range of 400 nm-500 nm. In some embodiments, the reflective backsheet also includes a multilayer optical stack comprising PEN first optical layers and second optical layers with different indices of refraction that reflects at least a portion of the light in the range of wavelengths that corresponds with the absorption bandwidth of the photovoltaic cell. In some embodiments, the reflective back sheet has a left band edge in the range of 600 nm to 900 nm and transmits visible light. In some embodiments, reflective multilayer optical film backsheets are textured such that the optical layers reflect light at an angle which provides total internal reflection of light off the front air interface of the photovoltaic module back onto the photovoltaic cells. In some embodiments, a solar concentrating mirror is adjacent to a photovoltaic cell, or plurality of photovoltaic cells, for increasing solar flux having a bandwidth of light that corresponds to the absorption bandwidth of the photovoltaic cell onto the photovoltaic cell. In some embodiments, the resulting article reflects at least a portion of the light across the range of wavelengths that corresponds with the absorption bandwidth of the solar cell and either transmits or absorbs a major portion of the light outside the absorption bandwidth of the solar cell to minimize overheating of the solar cell and solar cell encapsulating materials. In some embodiments, the article is a compliant sheet that may readily formed into useful shapes or construction for concentrating solar light. The article may be thermoformed into troughs, ridges, parabolic shapes, and non-imaging concentrating geometries for reflecting only electromagnetic energy onto a solar cell that is useful for generating electricity. In some embodiments, the reflective concentrating mirror includes a multi-layer optical stack comprising a plurality of alternating first optical layers not including PEN (polyethylenenaphthalate) and second optical layers with different refractive indices that reflect at least 90% of the light having a bandwidth of at least 30 nm over a wavelength range of 400 nm-500 nm. In some embodiments, the reflective film also includes a second multilayer optical stack comprising PEN first optical layers and second optical layers with different indices of refraction that reflects at least a portion of the light in the range of wavelengths that corresponds with the absorption bandwidth of the photovoltaic cell. In some embodiments, the second reflective multi-layer optical film has a left band edge in the range of 600 nm to 900 nm and transmits visible light. Visible light transmitting mirrors are useful in BIPV applications for the purpose of daylighting the interior of a building or structure. In some embodiments, broad band mirrors can be used to concentrate solar energy onto a solar energy absorbing device that contain heat transfer fluids that heat up and whose thermal energy is then transferred (e.g., for heating) or turned into electrical power (e.g., by use of a steam turbine generator). In some embodiments, the reflective concentrating mirror includes a multilayer optical stack comprising a plurality of alternating first optical layers not including PEN (polyethylenenaphthalate) and second optical layers with different refractive indices that reflect at least 90% of the light having a bandwidth of at least 30 nm over a wavelength range of 400-500 nm (e.g., blue reflector). In some embodiments, the first non-PEN based multilayer optical stack reflects 300-400 nm (UV reflector) and even reflects 300 nm-500 nm (UV-blue reflector). In some embodiments, the reflective film also includes a second multilayer optical stack comprising PEN first optical layers and second optical layers with different indices of refraction that reflects at least a portion of the light beyond 500 nm. In some embodiments, the second multilayer optical stack also includes reflective metal layers on the side opposite the blue (400 nm-500 nm) reflecting multilayer optical stack. Metals useful for reflecting light include at least one of silver, copper, nickel, aluminum, or any combination thereof. In some embodiments, the multi-layer optical film includes a tie-layer that improves adhesion of the metal reflective layer to the multilayer optical film. In some embodiments, the tie-layer comprises a thin (10 nm-30 nm) inorganic oxide layer. Exemplary inorganic oxide tie-layers include titanium oxides, zirconium oxides, and aluminum oxides. In some embodiments, the broadband reflector has an average reflectivity of at least 95 percent over a wavelength range of 350 nm to 2500 nm.

Figure 12:
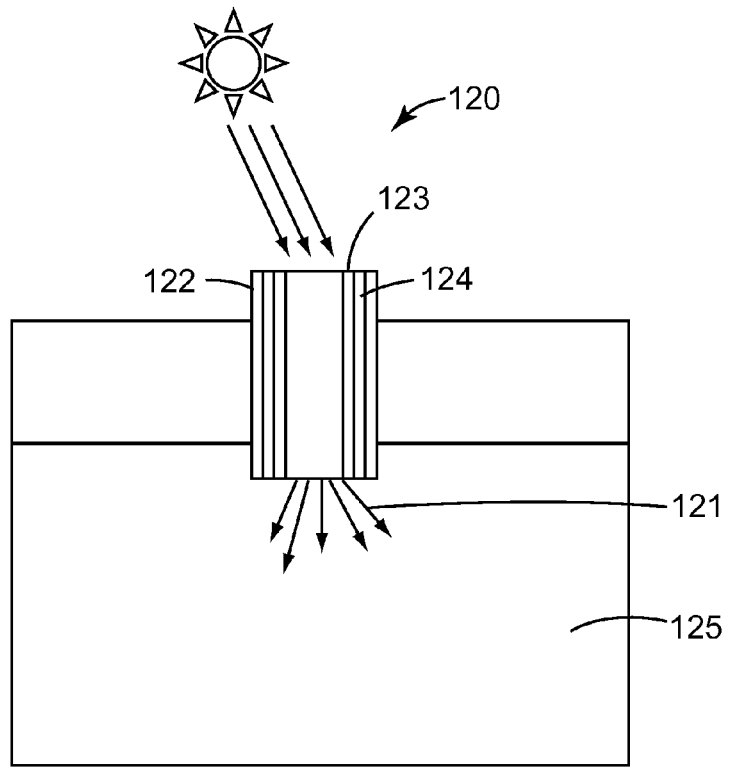
FIG. 12 is a schematic cross-sectional view of an exemplary building day lighting system with a hollow light guide comprising an exemplary assembly described herein.

Referring to FIG. 12, daylighting light guides 120 utilizes highly reflective multilayer optical visible mirror films 124 protected by assembly described herein 123, can be used to guide natural solar light 121 into buildings 125 for purposes of day lighting. Optional adhesive layer 122 can be used to laminate mirror film to the inside of light guide structures.

Hard coat layers can comprise, for example, a polyurethane layer. This polyurethane layer can be prepared, for example, from the condensation polymerization of a reaction mixture that comprises a polyol, a polyisocyanate, and a catalyst. The reaction mixture may also contain additional components which are not condensation polymerizable, and generally contains at least one UV stabilizer. As will be described below, the condensation polymerization reaction, or curing, generally is carried out in a mold or tool to generate the structured surface in the cured surface.

For the polyurethane polymers described in this disclosure that are formed from the condensation reaction of a polyol and a polyisocyanate they contain at least polyurethane linkages. The polyurethane polymers formed in this disclosure may contain only polyurethane linkages or they may contain other optional linkages such as polyurea linkages, polyester linkages, polyamide linkages, silicone linkages, acrylic linkages, and the like. As described below, these other optional linkages can appear in the polyurethane polymer because they were present in the polyol or the polyisocyanate materials that are used to form the polyurethane polymer. The polyurethane polymers of this disclosure are not cured by free radical polymerizations. For example, polyurethane oligomeric molecules with vinylic or other free radically polymerizable end groups are known materials, and polymers formed by the free radical polymerization of these molecules are sometimes referred to as "polyurethanes", but such polymers are outside of the scope of this disclosure.

A wide variety of polyols may be used. The term polyol includes hydroxyl-functional materials that generally comprise at least 2 terminal hydroxyl groups and may be generally described by the structure HO—B—OH, where the B group may be an aliphatic group, an aromatic group, or a group containing a combination of aromatic and aliphatic groups, and may contain a variety of linkages or functional groups, including additional terminal hydroxyl groups. Typically the HO—B—OH is a diol or a hydroxyl-capped prepolymer such as a polyurethane, polyester, polyamide, silicone, acrylic, or polyurea prepolymer.

Examples of useful polyols include polyester polyols (such as lactone polyols), polyether polyols (such as polyoxyalkylene polyols), polyalkylene polyols, mixtures thereof, and copolymers therefrom. Polyester polyols are particularly useful. Among the useful polyester polyols are linear and non-linear polyester polyols including those made from polyethylene adipate, polybutylene succinate, polyhexamethylene sebacate, polyhexamethylene dodecanedioate, polyneopentyl adipate, polypropylene adipate, polycyclohexanedimethyl adipate, and poly ε-caprolactone. Particularly useful are aliphatic polyester polyols available from King Industries, Norwalk, Conn., under the trade designation "K-FLEX" (e.g., "K-FLEX 188" and "K-FLEX A308").

Where HO—B—OH is a hydroxyl-capped prepolymer, a wide variety of precursor molecules can be used to produce the desired HO—B—OH prepolymer. For example, the reaction of polyols with less than stoichiometric amounts of diisocyanates can produce a hydroxyl-capped polyurethane prepolymer. Examples of suitable diisocyanates include, for example, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'- tetraethyl)-biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethylcyclohexyl isocyanate (isophorone diisocyanate). For reasons of weatherability, generally aliphatic and cycloaliphatic diisocyanates are used.

An example of the synthesis of a HO—B—OH prepolymer is shown in Reaction Scheme 1 (where (CO) represents a carbonyl group C=O) below:

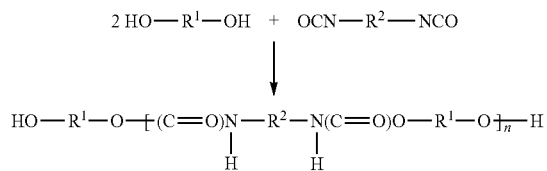

Reaction Scheme 1 where n is one or greater, depending upon the ratio of polyol to diisocyanate, for example, when the ratio is 2:1, n is 1. Similar reactions between polyols and dicarboxylic acids or dianhydrides can give HO—B—OH prepolymers with ester linking groups.

Polyols with more than two hydroxyl groups per molecule will lead to a crosslinked resin upon reaction with di or higher functionality isocyanates. Crosslinking prevents creep of the formed polymer, and helps maintain the desired structure. Typically the polyol is an aliphatic polyester polyol such as those available from King Industries, Norwalk, Conn., under the trade designation "K-FLEX" (e.g., "K-FLEX 188" and "K-FLEX A308").

A wide variety of polyisocyanates may be used. The term polyisocyanate includes isocyanate-functional materials that generally comprise at least 2 terminal isocyanate groups, such as diisocyanates that may be generally described by the structure OCN—Z—NCO, where the Z group may be an aliphatic group, an aromatic group, or a group containing a combination of aromatic and aliphatic groups. Examples of suitable diisocyanates include, for example, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate). For reasons of weatherability, generally aliphatic and cycloaliphatic diisocyanates are used. Some degree of crosslinking is useful in maintaining the desired structured surface. One approach is to use polyisocyanates with a higher functionality than 2.0. One particularly suitable aliphatic polyisocyanate is available under the trade designation "DESMODUR N3300A" from Bayer, Pittsburgh, Pa.

The aliphatic polyurethanes show good stability to ultraviolet weathering, but the addition of UV stabilizers can further improve their stability when exposed to the environment. Examples of suitable UV stabilizers include ultraviolet absorbers (UVAs), Hindered Amine Light Stabilizers (HALS), and antioxidants. It has been found useful to choose additives that are soluble in the reactive mixture, especially in the polyol. Benzotriazole UVAs (available, for example, under the trade designations "TINUVIN P 213," "TINUVIN P 234," "TINUVIN P 326," "TINUVIN P 327," "TINUVIN P 328," and "TINUVIN P 571" from BASF, Florham Park, N.J.); hydroxylphenyl triazines such as (available, for example, under the trade designations "TINUVIN 400" and "TINUVIN 405" from BASF); HALS (available, for example, under the trade designations "TINUVIN 123," "TINUVIN 144," "TINUVIN 622," "TINUVIN 765," and "TINUVIN 770" from BASF); and the antioxidants (available, for example, under the trade designations "IRGANOX 1010," "IRGANOX 1135," and "IRGANOX 1076" from BASF). The material available under the trade designation "TINUVIN B75," a product containing UVA, HALS and antioxidant available from BASF is also suitable.

The reactive mixture used to form the structured polyurethane layer may also contain additional additives if desired, as long as the additive does not interfere with the urethane polymerization reaction or adversely affect the optical properties of the formed structured polyurethane layer. Additives may be added to aid the mixing, processing, or coating of the reactive mixture or to aid the final properties of the formed structured polyurethane layer. Examples of additives include: particles, including nanoparticles or larger particles; mold release agents; low surface energy agents; antimildew agents; antifungal agents; antifoaming agents; antistatic agents; and coupling agents such as amino silanes and isocyanato silanes. Combinations of additives can also be used.

In some embodiments, the structured layer has a variable crosslink density throughout the thickness of the layer. For example, there may be a higher crosslink density at the surface of the structured layer. The crosslink density may be increased at the surface of the structured surface film using electron beam irradiation at relatively low voltage such as 100 kV to 150 kV.

In some embodiments, for example, the polyol and polyisocyanate reaction may proceed without a catalyst, and the crosslinking accelerated by free radicals formed via electron beam irradiation. This may be advantageous, in that the catalysts may contribute to oxidative and photo-degradation of the polyurethane polymer. In another embodiment, the reactive mixture is polymerized with the above preferred catalysts, and then further cross-linked with electron beam irradiation. Higher cross-link densities achieved with electron beam irradiation may increase the durability of the polyurethane, especially to abrasion such as from falling sand. Electron beam irradiation can be controlled to provide higher cross-link density at the surface of the polyurethane structured surface than in the bulk of the polyurethane article. High cross-link density has the desirable effect of minimizing transmission losses from abrasion. For example, exposure of surface structured aliphatic polyurethanes to 30 megarads dosage at 120 kV decreases transmission losses to less than 3%.

EXEMPLARY EMBODIMENTS

1A. A UV stable assembly comprising:
multi-layer optical film comprising at least a first plurality of first and second optical layers reflecting at least 50 (in some embodiments, at least 55, 60, 65, 70, 75, 80, 85, or even at least 90) percent of incident UV light over at least a 30 nanometer wavelength range in a wavelength range from at least 300 nanometers to 400 nanometers, and
a second plurality of first and second optical layers reflecting at least 50 (in some embodiments, at least 60, 65, 70, 75, 80, 85, 90, 95, 96, 97, 98, or even at least 99) percent of incident light over at least 30 nanometer wavelength in a wavelength range from at least 430 nanometers to 600 nanometers (in some embodiments, from at least 430 nm to 500 nm, 430 nm to 600 nm, 440 nm to 500 nm, 450 nm to 500 nm, 430 nm to 470 nm, 440 nm to 470 nm, or even at least 450 nm to 480 nm).

2A. The UV stable assembly of Embodiment 1A, wherein at least one of the first or second optical layers of at least one of the first or second plurality of layers therein comprises a UV absorber.

3A. The assembly of any preceding Embodiment A having a UV transmission band edge in a range from 10 to 90 percent transmission spanning less than 20 nanometers (in some embodiments, less than 15 nanometers, or even less than 10 nanometers).

4A. The assembly of any preceding Embodiment A, wherein layers comprising the assembly collectively have thickness in a range from 25 micrometers to 250 micrometers.

5A. The assembly of any preceding Embodiment A, wherein at least one of the first or second plurality of first and second optical layers have a collective thickness in a range from 15 micrometers to 25 micrometers 6A. The assembly of any preceding Embodiment A, wherein the first optical layers of the first plurality of layers comprise PMMA, a blend of PMMA and PVDF, PC, PET, COC, or TPU, and wherein the second optical layers of the first plurality of layers comprise THV, PMMA, CoPMMA, or a blend of PVDF and PMMA.

7A. A light assembly comprising the assembly of any preceding Embodiment A.

8A. A lighted sign comprising the assembly of any of Embodiments 1A to 6A.

9A. An LCD comprising the assembly of any of Embodiments 1A to 6A.

10A. An LED comprising the assembly of any of Embodiments 1A to 6A.

11A. A building daylighting system comprising the assembly of any of Embodiments 1A to 6A.

12A. A photovoltaic module comprising the assembly of any of Embodiments 1A to 6A.

13A. The photovoltaic module of Embodiment 12A that is a flexible module.

14A. An article comprising a substrate having a major surface, and the assembly of any of Embodiments 1A to 6A on at least a portion of the major surface.

15A. A light guide comprising the assembly of any of Embodiments 1A to 6A.

16A. Sunglasses comprising the assembly of any of Embodiments 1A to 6A.

17A. A wavelength selective solar concentrating mirror comprising the assembly of any of Embodiments 1A to 6A.

18A. A broadband solar concentrating mirror comprising the assembly of any of Embodiments 1A to 6A.

19A. The assembly of any of Embodiments 1A to 6A further comprising at least one layer comprising PEN (in some embodiments, reflective over a range from at least 400 nm to 700 nm 400 nm to 800 nm, 400 nm to 900 nm, 800 nm to 1200 nm, 800 nm to 1600 nm, or even at least 800 nm to 2500 nm), wherein the assembly has, in order, the first plurality of first and second optical layers, the second plurality of first and second optical layers, and the at least one layer comprising PEN.

20A. The assembly of any of Embodiments 1A to 6A further comprising at least one layer comprising PEN (in some embodiments, reflective over a range from at least 400 nm to 700 nm 400 nm to 800 nm, 400 nm to 900 nm, 800 nm to 1200 nm, 800 nm to 1600 nm, or even at least 800 nm to 2500 nm), and a metal (e.g., aluminum, silver, gold, copper, and combinations thereof) reflective layer, wherein the assembly has, in order, the first plurality of first and second optical layers, the second plurality of first and second optical layers, the at least one layer comprising PEN, and the metal reflective layer.

21A. The assembly of any of Embodiments 1A to 6A further comprising a multi-layer optical film comprising at least one layer comprising PEN, wherein the assembly has, in order, the first plurality of first and second optical layers, the second plurality of first and second optical layers, and the multi-layer optical film comprising at least one layer comprising PEN, and wherein the assembly is reflective over a range from at least 400 nm to 700 nm 400 nm to 800 nm, 400 nm to 900 nm, 800 nm to 1200 nm, 800 nm to 1600 nm, or even at least 800 nm to 2500 nm.

22A. The assembly of any of Embodiments 1A to 6A further comprising:
a multi-layer optical film comprising at least one layer comprising PEN (in some embodiments, reflective over a range from at least 400 nm to 700 nm 400 nm to 800 nm, 400 nm to 900 nm, 800 nm to 1200 nm, 800 nm to 1600 nm, or even at least 800 nm to 2500 nm), and
a metal (e.g., aluminum, silver, gold, copper, and combinations thereof) reflective layer (in some embodiments, reflective over a range from at least 400 nm to 700 nm 400 nm to 800 nm, 400 nm to 900 nm, 800 nm to 1200 nm, 800 nm to 1600 nm, or even at least 800 nm to 2500 nm), wherein the assembly is reflective over a range from at least 400 nm to 700 nm (in some embodiments, from at least 400 nm to 800 nm, 400 nm to 900 nm, 800 nm to 1200 nm, 800 nm to 1600 nm, or even at least 800 nm to 2500 nm),
wherein the assembly has, in order, the first plurality of first and second optical layers, the second plurality of first and second optical layers, the a multi-layer optical film comprising at least one layer comprising PEN, and the metal reflective layer.

23A. The assembly of any embodiment 1A to 6A further comprising a reflective polarizer.

1B. A UV stable assembly comprising
a first layer that absorbs at least 90 (in some embodiments, at least 91, 92, 93, 94, 95, 96, 97, 98, or even at least 99) percent of incident UV light over a wavelength range from at least 300 nanometers to 400 nanometers;
a multi-layer optical film comprising a plurality of first and second optical layers that reflects at least 50 (in some embodiments, at least 60, 65, 70, 75, 80, 85, 90, 95, 96, 97, 98, or even at least 99) percent of incident light over at least 30 nanometer wavelength in a wavelength range from at least 430 nanometers to 600 nanometers (in some embodiments, from at least 430 nm to 500 nm, 430 nm to 600 nm, 440 nm to 500 nm, 450 nm to 500 nm, 430 nm to 470 nm, 440 nm to 470 nm, or even at least 450 nm to 480 nm), wherein the multi-layer optical film is essentially free of PEN (i.e., less than 1 (in some embodiments, less than 0.75, 0.5, 0.25, or even less than 0.1) percent by weight PEN, based on the total weight of the multi-layer optical film); and a material that absorbs at least some (in some embodiments, at least 0.0001, 0.001, 0.01, 0.1, 1, 5, 10, 25, 50, 75, 90, 95, 96, 97, 98, or even at least 99) percent of incident light over a wavelength range from at least 430 nanometers to 500 nanometers (in some embodiments, from at least 440 nm to 500 nm, 450 nm to 500 nm, 430 nm to 470 nm, 440 nm to 470 nm, or even at least 450 nm to 480 nm), wherein the assembly has, in order, the first layer that absorbs at least 90 percent of incident UV light, the multi-layer optical film comprising a plurality of first and second optical layers that reflects at least 50 percent of incident light over a wavelength range from at least 430 nm to 500 nm, and the material that absorbs at least some incident light over a wavelength range from at least 430 nm to 500 nm.

2B. The assembly of Embodiment 1B, wherein the multi-layer optical film comprises a UV absorber.

3B. The assembly of any preceding Embodiment B having a UV transmission band edge in a range from 10 to 90 percent transmission spanning less than 20 nanometers (in some embodiments, less than 15 nanometers, or even less than 10 nanometers).

4B. The assembly of any preceding Embodiment B, wherein layers comprising the article collectively have a thickness in a range from 25 micrometers to 250 micrometers.

5B. The assembly of any preceding Embodiment B, wherein the plurality of the first and second optical layers have a collective thickness in a range from 15 micrometers to 25 micrometers.

6B. The assembly of any preceding Embodiment B, wherein the at least first optical layer comprises PMMA, a blend of PMMA and PVDF, PC, PET, COC, or TPU, and wherein the second optical layer comprises THV, PMMA, CoPMMA, or a blend of PVDF and PMMA.

7B. The assembly of any preceding Embodiment B, further comprising a metal (e.g., aluminum, silver, gold, copper, and combinations thereof) reflective layer, wherein the assembly has, in order, the first layer that absorbs at least 90 percent of incident UV light, the multi-layer optical film comprising a plurality of first and second optical layers that reflects at least 50 percent of incident light, the material that absorbs at least some incident light, and the metal reflective layer.

8B. A light assembly comprising the assembly of any preceding Embodiment B.

9B. A lighted sign comprising the assembly of any of Embodiments 1B to 7B.

10B. An LCD comprising the assembly of any of Embodiments 1B to 7B.

11B. An LED comprising the assembly of any of Embodiments 1B to 7B.

12B. A building daylighting system comprising the assembly of any of Embodiments 1B to 7B.

13B. A photovoltaic module comprising the assembly of any of Embodiments 1B to 7B.

14B. The photovoltaic module of Embodiment 13B that is a flexible module.

15B. An article comprising a substrate having a major surface, and the assembly of any of Embodiments 1B to 7B on at least a portion of the major surface.

16B. A light guide comprising the assembly of any of Embodiments 1B to 7B.

17B. Sunglasses comprising the assembly of any of Embodiments 1B to 7B.

18B. A wavelength selective solar concentrating mirror comprising the assembly of any of Embodiments 1B to 7B.

19B. A broadband solar concentrating mirror comprising the assembly of any of Embodiments 1B to 7B.

20B. The assembly of any embodiment 1B to 7B further comprising a reflective polarizer.

1C. An assembly comprising:

a multi-layer optical film comprising at least first and second optical layers reflecting at least 50 (in some embodiments, at least 60, 65, 70, 75, 80, 85, 90, 95, 96, 97, 98, or even at least 99) percent of incident light over at least 30 nanometer wavelength in a wavelength range from at least 430 nanometers to 600 nanometers (in some embodiments, from at least 430 nm to 500 nm, 430 nm to 600 nm, 440 nm to 500 nm, 450 nm to 500 nm, 430 nm to 470 nm, 440 nm to 470 nm, or even at least 450 nm to 480 nm), wherein the plurality of first and second optical layers is essentially free of PEN (i.e., less than 1 (in some embodiments, less than 0.75, 0.5, 0.25, or even less than 0.1) percent by weight PEN, based on the total weight of the multi-layer optical film); and a multi-layer optical film comprising at least one layer comprising PEN (in some embodiments, reflective over a range from at least 400 nm to 700 nm 400 nm to 800 nm, 400 nm to 900 nm, 500 nm to 700 nm, 500 nm to 900 nm, 800 nm to 1200 nm, 800 nm to 1600 nm, or even at least 800 nm to 2500 nm).

2C. The assembly of Embodiment 1C, wherein the multi-layer optical film comprising at least the first and second optical layers comprises a UV absorber.

3C. The assembly of any preceding Embodiment C having a UV transmission band edge in a range from 10 to 90 percent transmission spanning less than 20 nanometers (in some embodiments, less than 15 nanometers, or even less than 10 nanometers).

4C. The assembly of any preceding Embodiment C, wherein layers comprising the assembly collectively have thickness in a range from 25 micrometers to 250 micrometers.

5C. The assembly of any preceding Embodiment C, wherein the plurality of first and second optical layers have a collective thickness in a range from 15 micrometers to 25 micrometers.

6C. The assembly of any preceding Embodiment C, wherein the first optical layers of the multi-layer optical film comprise PMMA, a blend of PMMA and PVDF, PC, PET, COC, or TPU, and wherein the second optical layers of the multi-layer optical film comprise THV, PMMA, CoPMMA, or a blend of PVDF and PMMA.

7C. The assembly of any preceding Embodiment C further comprising a metal (e.g., aluminum, silver, gold, copper, and combinations thereof) reflective layer, wherein the assembly comprises, in order, the multi-layer optical film, the multi-layer optical film comprising at least one layer comprising PEN, the layer that absorbs at least 90 (percent of incident UV light, and metal reflective layer.

8C. A light assembly comprising the assembly of any preceding Embodiment C.

9C. A lighted sign comprising the assembly of any of Embodiments 1C to 7C.

10C. An LCD comprising the assembly of any of Embodiments 1C to 7C.

11C. An LED comprising the assembly of any of Embodiments 1C to 7C.

12C. A building daylighting system comprising the assembly of any of Embodiments 1C to 7C.

13C. A photovoltaic module comprising the assembly of any of Embodiments 1C to 7C.
14C. The photovoltaic module of Embodiment 13C that is a flexible module.
15C. An article comprising a substrate having a major surface, and the assembly of any of Embodiments 1C to 7C on at least a portion of the major surface.
16C. A light guide comprising the assembly of any of Embodiments 1C to 7C.
17C. Sunglasses comprising the assembly of any of Embodiments 1C to 7C.
18C. A wavelength selective solar concentrating mirror comprising the assembly of any of Embodiments 1C to 7C.
19C. A broadband solar concentrating mirror comprising the assembly of any of Embodiments 1C to 7C.
20C. The assembly of any embodiment 1C to 7C further comprising a reflective polarizer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Film 1

A multilayer optical film was made with first optical layers of polyethylene 2,6 naphthalate (PEN) and second optical layers of polymethylmethacrylate (PMMA1) (obtained from Arkema Inc., Philadelphia, Pa., under the trade designation "PEXIGLAS VO44"). The polyethylene 2,6 naphthalate (PEN) was synthesized in a batch reactor with the following raw material charge: 2,6 dimethyl naphthalene dicarboxylate (136 kg), ethylene glycol (73 kg), manganese (II) acetate (27 grams), cobalt(II) acetate (27 grams), and antimony(III) acetate (48 grams). Under a pressure of 1520 torr or $2 \times 10^5$ N/m$^2$ (2 atm.), this mixture was heated to 254° C. while removing methanol (a transesterification reaction by-product). After 35 kg of methanol was removed, 49 grams of triethyl phosphonoacetate was charged to the reactor and the pressure was gradually reduced to (131 N/m$^2$) (1 torr) while heating to 290° C. The condensation reaction by-product, ethylene glycol, was continuously removed until a polymer with an intrinsic viscosity of 0.48 dL/g (as measured in 60/40 wt. % phenol/o-dichlorobenzene) was produced.

The PEN and PMMA1 were coextruded through a multilayer polymer melt manifold to create a multilayer melt stream having 550 alternating first and second optical layers. In addition to the first and second optical layers, a pair of non-optical layers also comprising PEN was coextruded as protective skin layers on either side of the optical layer stack. This multilayer coextruded melt stream was cast onto a chilled roll at 22 meters per minute creating a multilayer cast web about 1075 micrometers (43 mils) thick.

The multilayer cast web was then heated in a tenter oven at 145° C. for 10 seconds prior to being biaxially oriented to a draw ratio of 3.8×3.8. The oriented multilayer film was further heated to 225° C. for 10 seconds to increase crystallinity of the PEN layers. Reflectivity of this multilayer visible mirror film was measured with a spectrophotometer (obtained from Perkin-Elmer, Inc., Waltham, Mass., under the trade designation "LAMBDA 950") determined to have an average reflectivity of 98.5% over a bandwidth of 390 nm-1600 nm.

Film 2

An ultraviolet (UV) reflective multilayer optical film was made with first optical layers of polyethylene terephthalate ("PET1") (obtained under the trade designation "EAST-APAK 7452" from Eastman Chemical, Kingsport, Tenn. and second optical layers of a co-polymer of 75 wt. % methyl methacrylate and 25 wt. % ethyl acrylate ("coPMMA1") (obtained under the trade designation "PERSPEX CP63" from Plaskolite, Columbus, Ohio). The PET1 and coPMMA1 were coextruded through a multilayer polymer melt manifold to form a stack of 224 optical layers. The layer thickness profile (layer thickness values) of this UV reflector was adjusted to be about a linear profile with the first (thinnest) optical layers adjusted to have about a ¼ Wave Optical Thickness (Index Times Physical thickness) for 350 nm light and progressing to the thickest layers which were adjusted to be about ¼ wave thick optical thickness for 400 nm light. Layer thickness profiles of such films were adjusted to provide for improved spectral characteristics using the axial rod apparatus reported in U.S. Pat. No. 6,783,349 (Neavin et al.), the disclosure of which is incorporated herein by reference, combined with layer profile information obtained with atomic force microscopic techniques.

In addition to these optical layers, non-optical protective skin layers comprising a blend of 62 wt. % polymethylmethacrylate ("PMMA") (obtained under the trade designation "PERSPEX PCP82" from Plaskolite), 35 wt. % polyvinylidene fluoride PVDF; obtained under the trade designation "(DYNEON 6008" from DYNEON, Oakdale, Minn.), and 3 wt. % of UV absorber (obtained under the trade designation "TINUVIN 1577 UVA" from BASF, Florham Park, N.J.) was compounded into these protective skin layers. This multilayer coextruded melt stream was cast onto a chilled roll at 5.4 meters per minute creating a multilayer cast web about 500 micrometers (20 mils) thick. The multilayer cast web was then preheated for about 10 seconds at 95° C. and biaxially oriented at draw ratios of 3.5×3.7. The oriented multilayer film was further heated at 225° C. for 10 seconds to increase crystallinity of the PET layers.

The UV-reflective multilayer optical film was measured with the spectrophotometer ("LAMBDA 950") and determined to transmit less than 2 percent of the UV light over a bandwidth of 350 nm-400 nm.

Example 1

A UV reflective multilayer optical film was made as described in Film 2, except 550 layers were cast onto a chilled roll at 4.3 meters per minute creating a multilayer cast web approximately 625 micrometers (25 mils) thick with a layer thickness profile designed to reflect 380 nm-500 nm.

Figure 13:
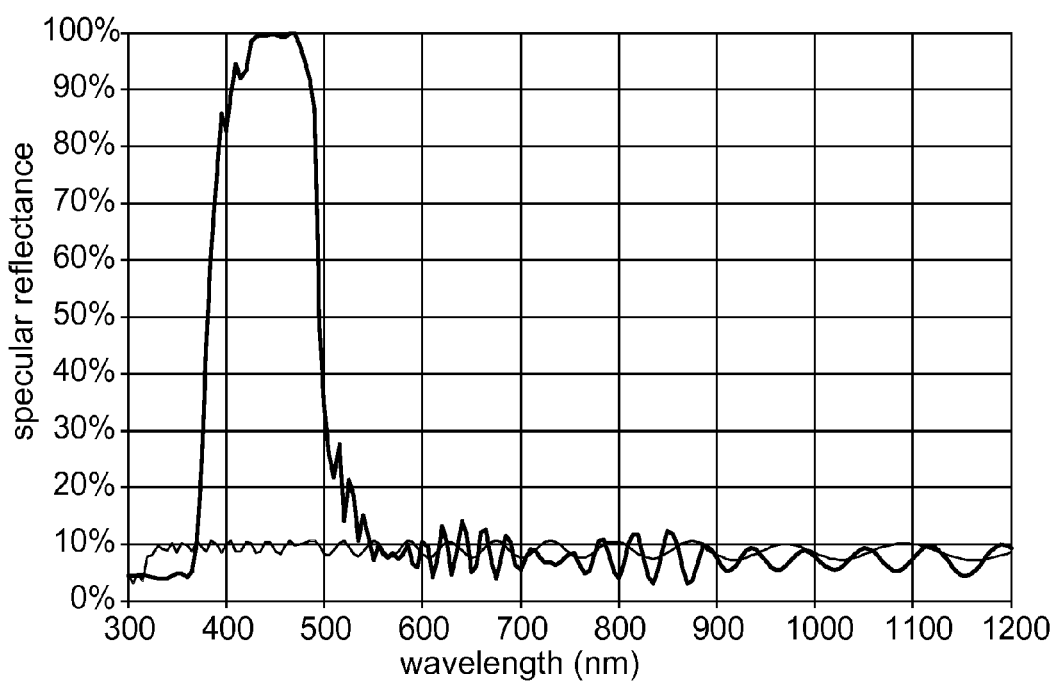
FIG. 13 is the reflection spectra of an exemplary multi-layer optical film used to make exemplary assemblies described herein.

The UV-reflective multilayer optical film was measured with the spectrophotometer ("LAMBDA 950") and determined to transmit less than 3 percent of the light over a bandwidth of 395 nm-490 nm as shown in FIG. 13.

Comparative Example A

Figure 16:
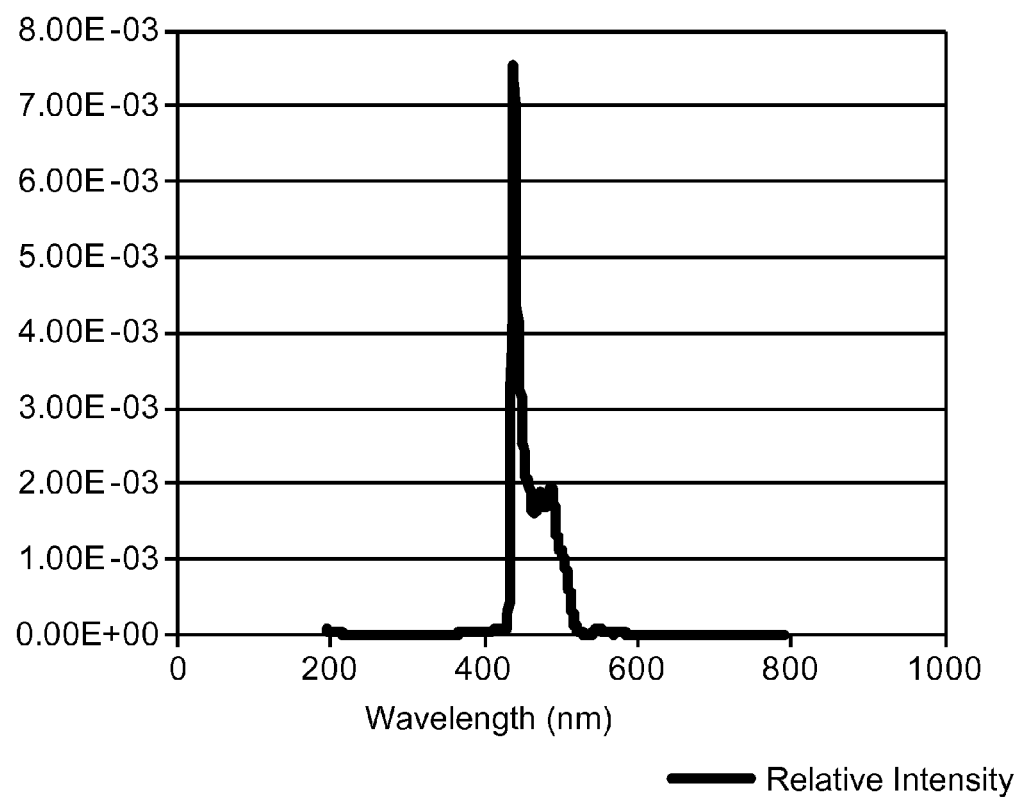
FIG. 16 is the emission spectra of a light source used in testing exemplary assembly described herein.

Comparative Example A was prepared described for Film 1 and then laminated to glass with an optically clear adhesive (obtained under the trade designation "8172P" from 3M Company, St. Paul, Minn.) and exposed to an ultra high pressure (UHP) lamp (obtained under the trade designation "69382: P-VIP 132-150/1.0 E23H" from Osram Sylvania, Munich, Germany) covered by a long pass filter having 434 nm cut-off (obtained from Corning, Corning, N.Y.) and a short pass filter having a 490 nm cut-off (obtained from Unaxis USA (now Oerlikon USA, Inc., St. Petersburg, Fla.) to have an emission spectra as shown in FIG. 16. After 1500 hours exposure to the 434 nm filtered UHP lamp, the average reflectivity over a range from 400 nm to 500 nm of this film decreased from 98.9% to 84.9%.

Comparative Example B

UV Mirror film having a right reflection band edge of 400 nm was made as described for Film 2 and laminated to Comparative Example A with optically clear adhesive ("8172P"). Three replicates were also prepared.

The four samples were exposed to an UHP lamp covered by a long pass filter having 434 nm cut-off (as described in Comparative Example A). After 1500 hours exposure to the 434 nm filtered UHP lamp, the average (of the four samples) reflectivity over a range from 400 nm to 500 nm of this film decreased from 97.5% to 87.1%.

Example 2

Figure 15:
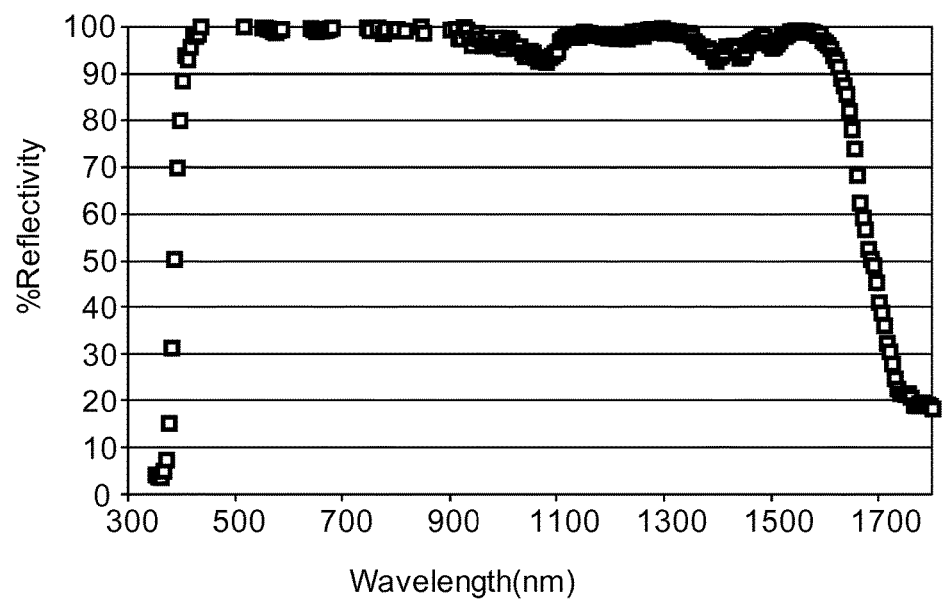
FIG. 15 is the reflection spectra of an exemplary assembly described herein.

UV Mirror film having a right reflection band edge of 500 nm was made as described for Example 1 and laminated to Comparative Example A with optically clear adhesive ("8172P"). Three replicates were also prepared. The reflection spectra was measured using a spectrophotometer (obtained under the trade designation "LAMBDA 950" from Perkin-Elmer, Waltham, Mass.) (see FIG. 15).

The four samples were exposed to an UHP lamp covered by a long pass filter having 434 nm cut-off (as described in Comparative Example A). After 1576 hours exposure to the 434 nm filtered UHP lamp, the average (of the four samples) reflectivity over a range from 400 nm to 500 nm of this film decreased from 97.4% to 96.9%.

Comparative Example C

Film laminates made as described in Comparative Example A were exposed to irradiation from a Xenon arc lamp per ASTM-G155-05A (October 2005). After 4000 hours exposure, the average reflectivity over a wavelength range of 400 nm to 1200 nm decreased from 98.9% to 89.1%.

Comparative Example D

Film laminates made as described in Comparative Example B were exposed to irradiation from a Xenon arc lamp as generally described in ASTM-G155-05A (October 2005). After 4000 hours of exposure, the average reflectivity over a wavelength range of 400 nm to 1200 nm decreased from 97.5% to 92.8%.

Example 3

Film laminates made as described in Example 2 were exposed to irradiation from a Xenon arc lamp as generally described in ASTM-G155-05A (October 2005). After 6000 hours of exposure, the average reflectivity over a wavelength range of 400 nm to 1200 nm decreased from 97.4% to 96.1%.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An assembly comprising:
   a first multi-layer optical film comprised of at least 100 layers comprising at least first and second optical layers reflecting at least 50 percent of incident light over at least a 30 nanometer wavelength wide reflection band in a wavelength range from at least 430 nanometers to 500 nanometers, wherein the plurality of first and second optical layers is essentially free of 2,6 polyethylenenaphthalate; and
   a second multi-layer optical film comprised of at least 100 layers, wherein at least one layer comprising 2,6 polyethylenenaphthalate.

2. The assembly of claim 1, wherein the first multi-layer optical film comprising at least the first and second optical layers comprises an ultraviolet absorber.

3. The assembly of claim 1, wherein the first optical layers of the first multi-layer optical film comprise polymethylmethacrylate, a blend of polymethylmethacrylate and poly(vinylidene fluoride), polycarbonate, polyethylene terephthalate, cyclic olefin copolymer, or thermoplastic polyurethane, and wherein the second optical layers of the multi-layer optical film comprise a copolymer of tetrafluorethylene, hexafluoropropylene, and vinylidene fluoride, polymethylmethacrylate, copolymers of polymethylmethacrylate, or a blend of poly(vinylidene fluoride) and polymethylmethacrylate.

4. A light emitting diode comprising the assembly of claim 1.

5. A light guide comprising the assembly of claim 1.

6. Sunglasses comprising the assembly of claim 1.

7. A wavelength selective solar concentrating mirror comprising the assembly of claim 1.

8. A broadband solar concentrating mirror comprising the assembly of claim 1.

9. The assembly of claim 1 further comprising a reflective polarizer.

* * * * *